US010718993B2

(12) United States Patent
Hayashi et al.

(10) Patent No.: US 10,718,993 B2
(45) Date of Patent: Jul. 21, 2020

(54) BLADE OPENING AND CLOSING DEVICE AND IMAGE PICKUP DEVICE

(71) Applicant: SONY CORPORATION, Tokyo (JP)

(72) Inventors: Toshiro Hayashi, Chiba (JP); Takahiro Kobayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 22 days.

(21) Appl. No.: 15/533,431

(22) PCT Filed: Oct. 26, 2015

(86) PCT No.: PCT/JP2015/080114
§ 371 (c)(1),
(2) Date: Jun. 6, 2017

(87) PCT Pub. No.: WO2016/098453
PCT Pub. Date: Jun. 23, 2016

(65) Prior Publication Data
US 2017/0351161 A1 Dec. 7, 2017

(30) Foreign Application Priority Data

Dec. 19, 2014 (JP) .................. 2014-257930

(51) Int. Cl.
G03B 9/14 (2006.01)
G03B 9/06 (2006.01)
G03B 9/36 (2006.01)

(52) U.S. Cl.
CPC ............... G03B 9/14 (2013.01); G03B 9/06 (2013.01); G03B 9/36 (2013.01)

(58) Field of Classification Search
CPC .................. G03B 9/14; G03B 9/16
(Continued)

(56) References Cited

U.S. PATENT DOCUMENTS 4,338,013 A 7/1982 Shimada et al.
4,373,797 A 2/1983 Shimada et al.
(Continued)

FOREIGN PATENT DOCUMENTS

CN 1525230 A 9/2004
DE 3100474 A1 12/1981
(Continued)

OTHER PUBLICATIONS

International Search Report and Written Opinion of PCT Application No. PCT/JP2015/080114, dated Dec. 22, 2015, 02 pages of English Translation and 08 pages of ISRWO.

Primary Examiner — Christopher E Mahoney
(74) Attorney, Agent, or Firm — Chip Law Group

(57) ABSTRACT

An effect that drive of one of a first magnetic driving unit and a second magnetic driving unit prevents a movement of the other magnetic driving unit is not generated to appropriately control movements of first opening and closing blades and second opening and closing blades. A blade opening and closing device includes a base body which includes an opening for transmitting light, a first magnetic driving unit which includes a first magnet and a first coil, a second magnetic driving unit which includes a second magnet and a second coil, first opening and closing blades which are moved by the first magnetic driving unit relative to the base body and to open and close the opening, and second opening and closing blades which are moved by the second magnetic driving unit relative to the base body and to open and close the opening. A magnetic flux direction of the first magnetic driving unit is opposite to a magnetic flux direction of the second magnetic driving unit.

8 Claims, 17 Drawing Sheets

(58) Field of Classification Search
USPC .......................................................... 396/469
See application file for complete search history.

(56) References Cited

U.S. PATENT DOCUMENTS

| | | |
|---|---|---|
| 2004/0170423 A1 | 9/2004 | Kudo et al. |
| 2009/0110388 A1 | 4/2009 | Tsujiyama |
| 2013/0322866 A1 | 12/2013 | Suzuki |
| 2014/0010526 A1* | 1/2014 | Takahashi ................ G03B 9/42 |
| | | 396/469 |

FOREIGN PATENT DOCUMENTS

| | | |
|---|---|---|
| JP | 56-099330 A | 8/1981 |
| JP | 57-68220 U | 4/1982 |
| JP | 1982-068220 U | 4/1982 |
| JP | 63-26831 U | 2/1988 |
| JP | 1988-026831 U | 2/1988 |
| JP | 05-024900 Y2 | 6/1993 |
| JP | 2002-182268 A | 6/2002 |
| JP | 2004-264468 A | 9/2004 |
| JP | 2005-304221 A | 10/2005 |
| JP | 2007-155773 A | 6/2007 |
| JP | 2008-003272 A | 1/2008 |
| JP | 2009-106090 A | 5/2009 |
| JP | 2012-215658 A | 11/2012 |

\* cited by examiner

BLADE OPENING AND CLOSING DEVICE AND IMAGE PICKUP DEVICE

CROSS REFERENCE TO RELATED APPLICATIONS

This application is a U.S. National Phase of International Patent Application No. PCT/JP2015/080114 filed on Oct. 26, 2015, which claims priority benefit of Japanese Patent Application No. JP 2014-257930 filed in the Japan Patent Office on Dec. 19, 2014. Each of the above-referenced applications is hereby incorporated herein by reference in its entirety.

TECHNICAL FIELD

The present technology relates to a technical field of a blade opening and closing device which includes a first magnetic driving unit for moving first opening and closing blades and a second magnetic driving unit for moving second opening and closing blades and in which an opening of a base body is opened/closed by the first and second opening and closing blades and an image pickup device including the same.

CITATION LIST

Patent Document

Patent Document 1: Japanese Patent Application Laid-Open No. 2008-3272

BACKGROUND ART

In various image pickup devices such as a video camera and a still camera, an optical system including a lens group and an optical element and an image pickup element for photoelectrically converting light taken by the optical system are arranged. When an object is photographed, light enters the image pickup element via a focal plane shutter which functions as a blade opening and closing device.

There is a blade opening and closing device including first opening and closing blades, second opening and closing blades, a base body in which an opening has been formed, a first magnetic driving unit for moving the first opening and closing blades, and a second magnetic driving unit for moving the second opening and closing blades (for example, refer to Patent Document 1).

In such a blade opening and closing device, the first opening and closing blades and the second opening and closing blades are respectively moved by the first magnetic driving unit and the second magnetic driving unit in each mode in a predetermined state. A first magnet, a first coil, and a first yoke are provided in the first magnetic driving unit, and a second magnet, a second coil, and a second yoke are provided in the second magnetic driving unit. Currents are supplied to the first coil and the second coil, and the first opening and closing blades and the second opening and closing blades are separately moved.

When the object is photographed, a slit travel for moving the first opening and closing blades and the second opening and closing blades in the same direction is performed. At the time of the slit travel, the first opening and closing blades and the second opening and closing blades are moved in a state where a slit having a predetermined width is formed between the first opening and closing blades and the second opening and closing blades, and light passed through the slit and the opening enters from one of imaging surfaces of the image pickup element to the other imaging surface in order so that exposure is performed.

The light entered at the time of the slit travel is sequentially photoelectrically converted by the image pickup element to generate an image signal, and the generated image signal is transferred to a memory to generate an image of the object.

SUMMARY OF THE INVENTION

Problems to Be Solved By the Invention

Meanwhile, in the blade opening and closing device having the first and second magnetic driving units as described above, there is a possibility that drive of one of the first magnetic driving unit and the second magnetic driving unit has an effect on drive of the other magnetic driving unit.

For example, when the first magnetic driving unit and the second magnetic driving unit are aligned, depending on configurations of the first magnetic driving unit and the second magnetic driving unit, a magnetic flux generated when the first magnetic driving unit is driven enters a magnetic circuit of the second magnetic driving unit. The entered magnetic flux generates an induction voltage in the second magnetic driving unit. There is a possibility that a torque of the second magnetic driving unit is reduced.

Also, at the time of the slit travel, the second magnetic driving unit is driven subsequently to the drive of the first magnetic driving unit. However, when the magnetic flux generated when the first magnetic driving unit is driven enters the magnetic circuit of the second magnetic driving unit, there is a possibility that the entered magnetic flux delays a startup time (rise time) of the second magnetic driving unit and interrupts an appropriate movement.

Therefore, a purpose of a blade opening and closing device and an image pickup device according to the present technology is to solve the above problems and to appropriately control movements of first opening and closing blades and second opening and closing blades by preventing an effect that drive of one of a first magnetic driving unit and a second magnetic driving unit prevents a movement of the other magnetic driving unit.

Solutions to Problems

First, a blade opening and closing device according to the present technology includes a base body which includes an opening for transmitting light, a first magnetic driving unit which includes a first magnet and a first coil, a second magnetic driving unit which includes a second magnet and a second coil, first opening and closing blades which are moved by the first magnetic driving unit relative to the base body and open and close the opening, and second opening and closing blades which are moved by the second magnetic driving unit relative to the base body and open and close the opening. A magnetic flux direction of the first magnetic driving unit is opposite to a magnetic flux direction of the second magnetic driving unit.

Accordingly, when one of the first magnetic driving unit and the second magnetic driving unit is driven, an induction voltage is not generated which prevents movement of the other magnetic driving unit.

Second, it is desirable that the first magnetic driving unit and the second magnetic driving unit be arranged in contact with each other in the blade opening and closing device.

Accordingly, an entire arrangement space of the first magnetic driving unit and the second magnetic driving unit in the blade opening and closing device is reduced.

Third, in the blade opening and closing device, it is desirable that a first yoke be provided as a part of the first magnetic driving unit, a second yoke be provided as a part of the second magnetic driving unit, a plate-like first plate yoke part be provided as a part of the first yoke, a plate-like second plate yoke part be provided as a part of the second yoke, and the first plate yoke part and the second plate yoke part be arranged in contact with each other in a thickness direction.

Accordingly, the arrangement space of the first magnetic driving unit and the second magnetic driving unit in the thickness directions of the first plate yoke part and the second plate yoke part is reduced.

Fourthly, in the blade opening and closing device, it is desirable that a pair of first plate yoke parts be provided, a pair of second plate yoke parts be provided, the pair of first plate yoke parts and the pair of second plate yoke part be arranged in the same direction, the first magnet and the first coil be arranged between the pair of first plate yoke parts, and the second magnet and the second coil be arranged between the pair of second plate yoke parts.

Accordingly, the first plate yoke part and the second plate yoke part are aligned in the thickness direction.

Fifth, in the blade opening and closing device, it is desirable that a traveling direction of light for passing through the opening be assumed to be an optical axis direction, the first magnetic driving unit and the second magnetic driving unit be aligned in a direction perpendicular to the optical axis direction, the first magnet and the second magnet be bipolar magnetized, and a positional relation of an N-pole and an S-pole of the first magnet be opposite to that of the second magnet.

Accordingly, the first magnet and the second magnet are simplified.

Sixth, in the blade opening and closing device, it is desirable that the first opening and closing blades and the second opening and closing blades be movable between an opening position where the opening is opened and a closing position where the opening is closed, the first opening and closing blades and the second opening and closing blades be formed of a plurality of sheet-shaped sectors, at least the plurality of sectors be partially positioned to be overlapped in the thickness direction, and an overlapped area of the sectors is increased as the first opening and closing blades and the second opening and closing blades are moved from the closing position to the opening position.

Accordingly, the arrangement space of the first opening and closing blades and the second opening and closing blades is reduced at the opening position, and the area of the first opening and closing blades and the second opening and closing blades is increased at the closing position.

Seventh, in the blade opening and closing device, it is desirable that a storage case to be attached to the base body be provided and the first magnetic driving unit and the second magnetic driving unit be stored in the storage case.

Accordingly, it is not necessary to provide members for separately storing the first magnetic driving unit and the second magnetic driving unit, and both the first magnetic driving unit and the second magnetic driving unit are stored in the storage case.

Eighth, in the blade opening and closing device, it is desirable that the first magnetic driving unit and the second magnetic driving unit be aligned in a state where the axis direction of the first coil is the same as that of the second coil.

Accordingly, the whole size of the first magnetic driving unit and the second magnetic driving unit can be reduced in a direction perpendicular to the alignment direction of the first and second magnetic driving units.

Ninth, in the blade opening and closing device, it is desirable that the first magnetic driving unit and the second magnetic driving unit be aligned in a state where a direction perpendicular to the axis direction of the first coil is the same as that of the second coil.

Accordingly, the whole size of the first magnetic driving unit and the second magnetic driving unit can be reduced in a direction perpendicular to the alignment direction of the first and second magnetic driving units.

Tenth, in the blade opening and closing device, it is desirable that rotation of the first magnet move the first opening and closing blades, rotation of the second magnet move the second opening and closing blades, and the first magnet and the second magnet be aligned in a state where a rotation axis direction of the first magnet is the same as that of the second magnet.

Accordingly, the whole size of the first magnetic driving unit and the second magnetic driving unit can be reduced in a direction perpendicular to the rotation axis directions of the first magnet and the second magnet.

An image pickup device according to the present technology includes a blade opening and closing device which controls light to be taken in via an optical system and an image pickup element which photoelectrically converts the light to be taken via the optical system. The blade opening and closing device includes a base body which includes an opening for transmitting light, a first magnetic driving unit which includes a first magnet and a first coil, a second magnetic driving unit which includes a second magnet and a second coil, first opening and closing blades which are moved by the first magnetic driving unit relative to the base body and open and close the opening, and second opening and closing blades which are moved by the second magnetic driving unit relative to the base body and open and close the opening, and a magnetic flux direction of the first magnetic driving unit is opposite to that of the second magnetic driving unit.

Accordingly, in the blade opening and closing device, when one of the first magnetic driving unit and the second magnetic driving unit is driven, an induction voltage is not generated which prevents movement of the other magnetic driving unit.

Effects of the Invention

According to the present technology, when one of a first magnetic driving unit and a second magnetic driving unit is driven, an induction voltage is not generated which prevents movement of the other magnetic driving unit. Therefore, the effect for preventing the movement of the other magnetic driving unit due to the drive of one of the first magnetic driving unit and the second magnetic driving unit is not caused, and movements of the first opening and closing blades and the second opening and closing blades can be appropriately controlled.

Here, the effects described herein are only exemplary and not limited to these. Also, there may be an additional effect.

BRIEF DESCRIPTION OF DRAWINGS

FIG. 1 is a perspective view of the image pickup device.

FIG. 10 is a front view of first opening and closing blades positioned at an opening position and second opening and closing blades positioned at a closing position.

MODE FOR CARRYING OUT THE INVENTION

An embodiment for carrying out the present technology is described below with reference the attached drawings.

In the embodiment to be described below, the image pickup device according to the present technology is applied to a still camera, and the blade opening and closing device according to the present technology is applied to a focal plane shutter provided in the still camera.

Note that the scope of the application of the present technology is not limited to the still camera and the focal plane shutter provided in the still camera. For example, the present technology can be widely applied to various image pickup devices incorporated in a video camera and other apparatus and various blade opening and closing devices such as an iris provided in the image pickup devices.

In the following description, upward, downward, forward, rearward, rightward and leftward directions indicate directions viewed from a photographer at the time of photographing by the still camera. Therefore, an object side is the front side, and a photographer is the rear side.

Note that the upward, downward, forward, rearward, rightward and leftward directions are indicated below for convenience of the description, and the directions are not limited to those when the present technology is carried out.

Also, a lens group described below may include a lens group including a single or a plurality of lenses and may include a lens group including a single or a plurality of lenses and other optical elements such as an iris.

Schematic Configuration of Image Pickup Device

Figure 1:
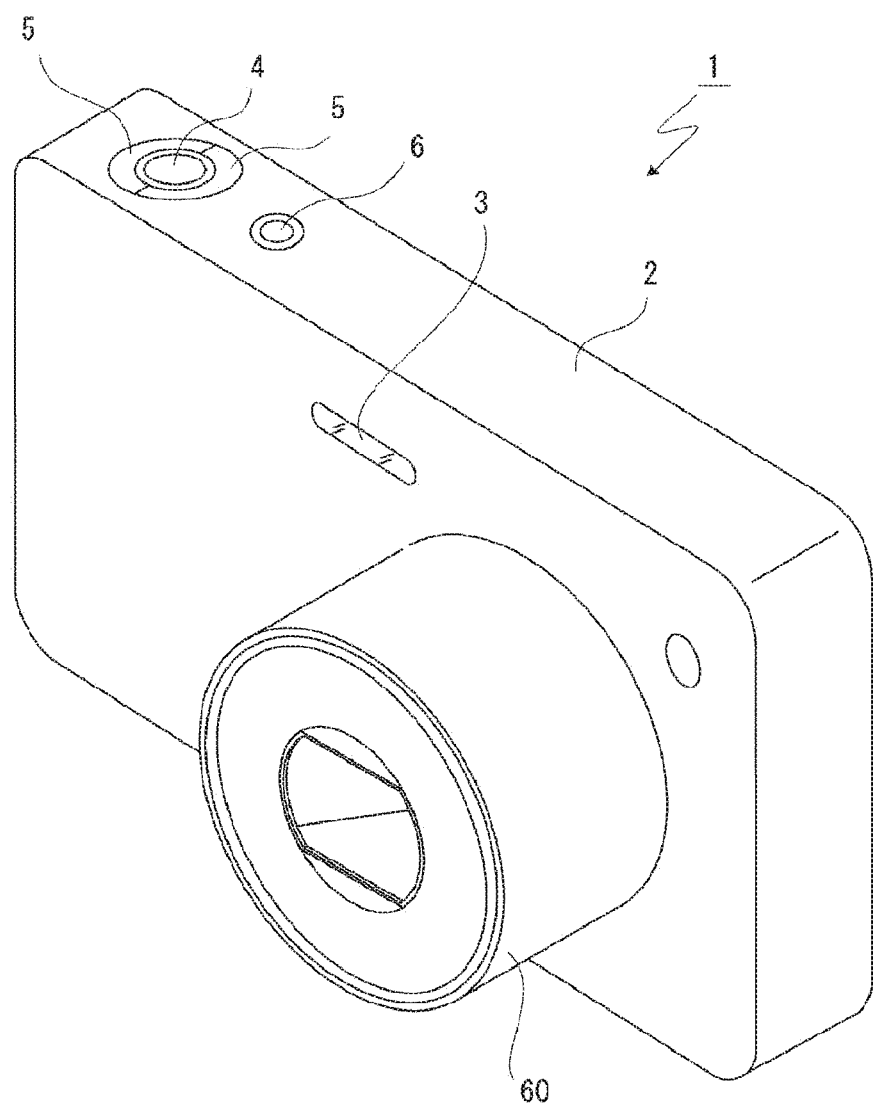
FIG. 1 is a view of an embodiment of a blade opening and closing device and an image pickup device according to the present technology which are also illustrated in FIGS. 2 to 19.
Figure 2:
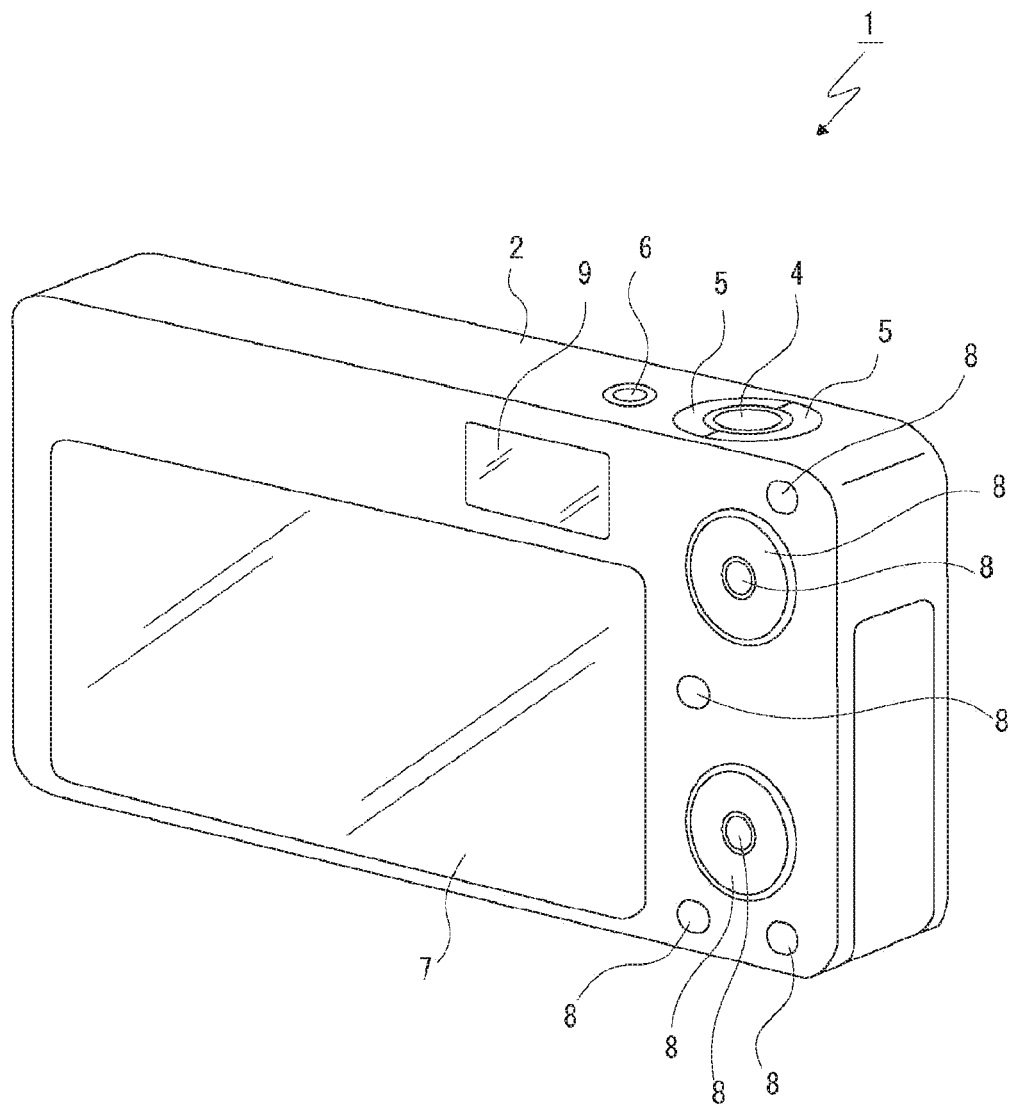
FIG. 2 is a perspective view of the image pickup device viewed from a direction different from that in FIG. 1.
Figure 3:
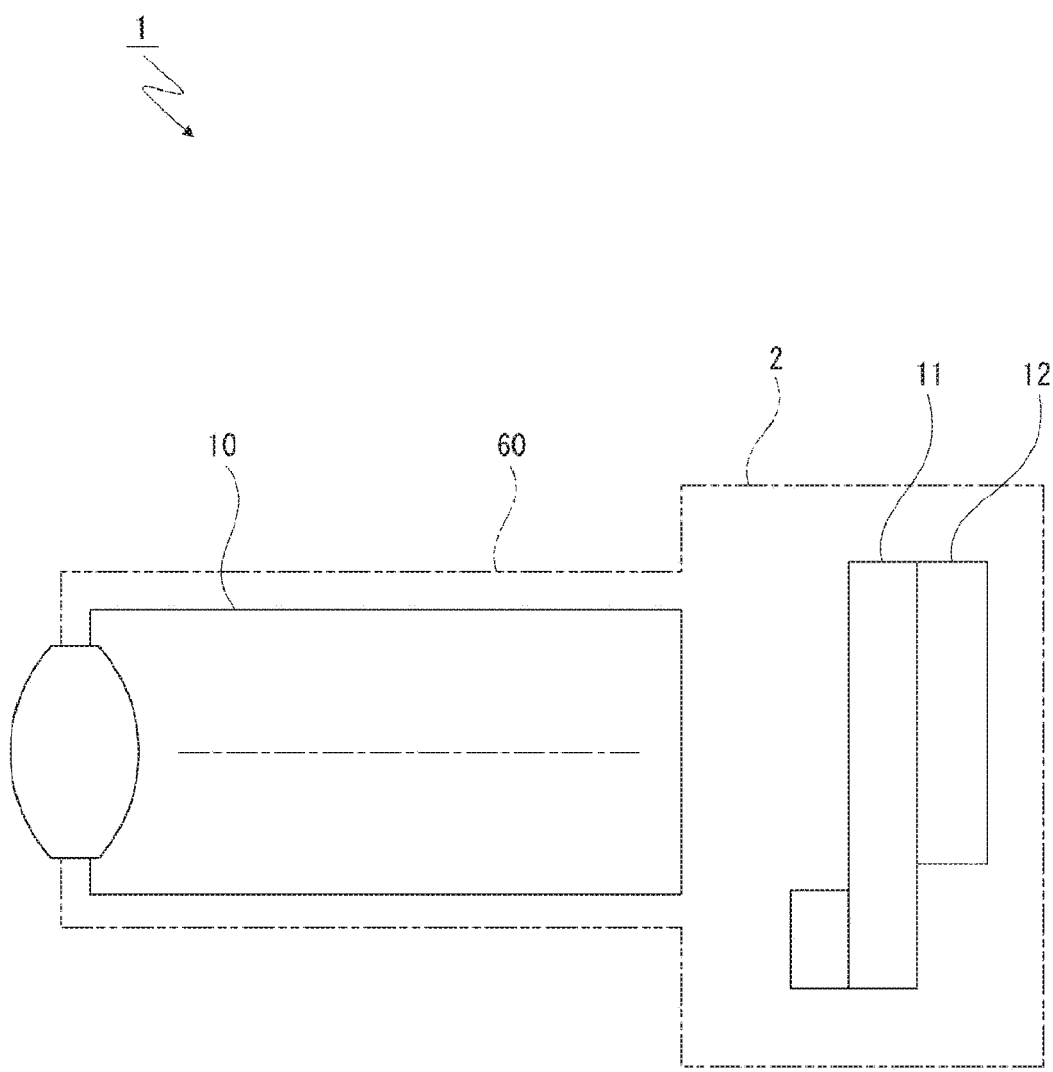
FIG. 3 is a schematic side view of the image pickup device.

First, a schematic configuration of the image pickup device is described (refer to FIGS. 1 to 3).

As illustrated in FIGS. 1 and 2, for example, an image pickup device 1 has necessary parts arranged inside and outside of a horizontally long flat housing 2. The image pickup device 1 may be an apparatus having a detachable interchangeable lens 60 as illustrated in FIG. 1.

A flash 3 is provided on a front surface of the housing 2. A shutter button 4, zoom switches 5, and a power button 6 are provided on a top surface of the housing 2 (refer to FIGS. 1 and 2). A display 7, various operation parts 8, and a finder 9 are provided on a rear surface of the housing 2.

As illustrated in FIG. 3, in the housing 2, an optical system 10 including a lens group, an optical element, and the like, a blade opening and closing device (focal plane shutter) 11 for controlling an amount of light taken by the optical system 10, and an image pickup element 12 for photoelectrically converting the light taken via the blade opening and closing device 11 are arranged in order from the front side.

Configuration of Blade Opening and Closing Device

A configuration of the blade opening and closing device 11 is described below (refer to FIGS. 4 to 8).

The blade opening and closing device 11 includes a base body 13, a pressing plate 14, a storage case 15, a first magnetic driving unit 16, a second magnetic driving unit 17, pressing covers 18, first opening and closing blades 19, second opening and closing blades 20, a first link 21, and a second link 22. These components are arranged on the front surface side of the image pickup element 12.

Figure 4:
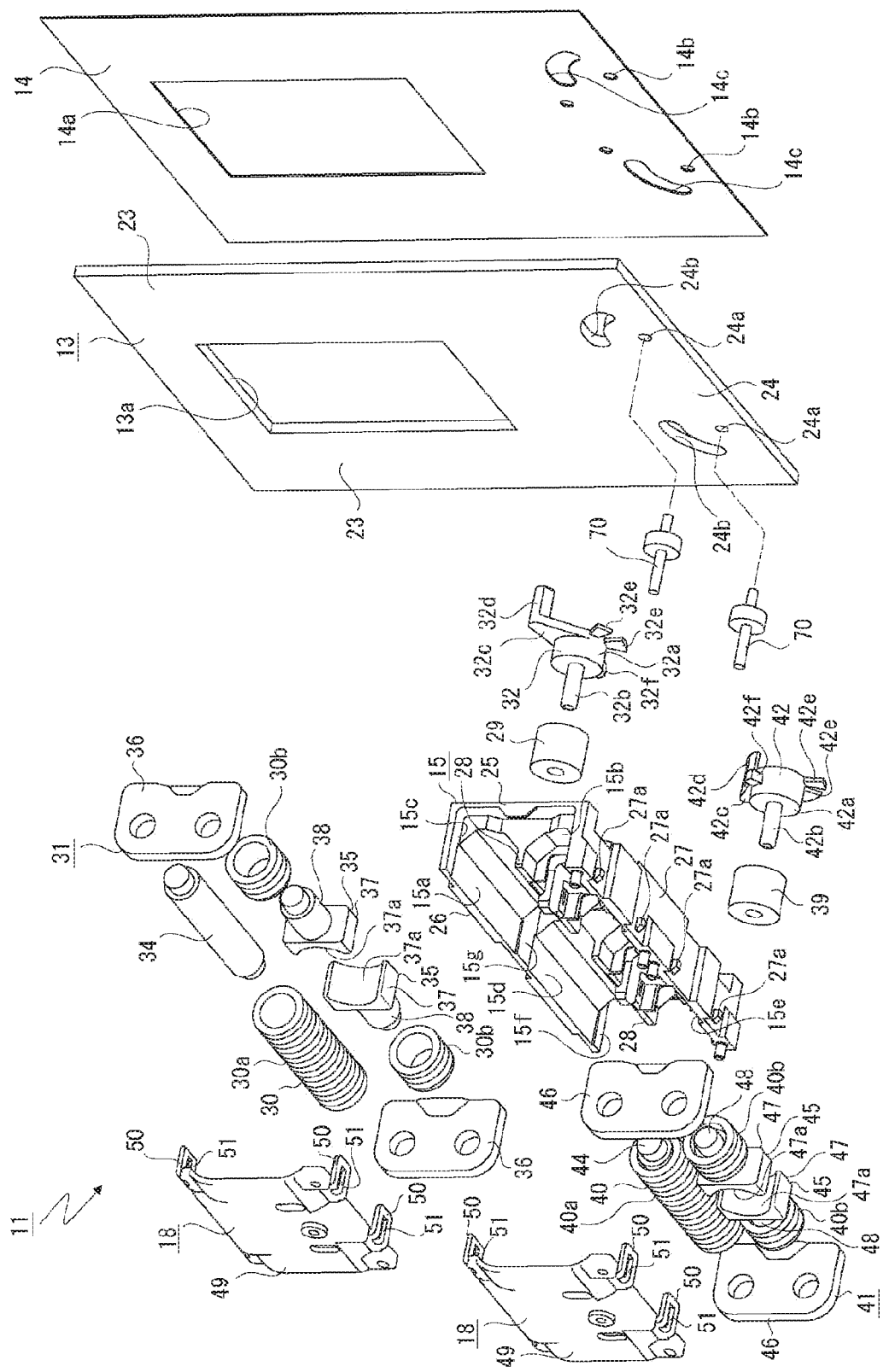
FIG. 4 is a disassembled perspective view of the blade opening and closing device of which a part is omitted.
Figure 5:
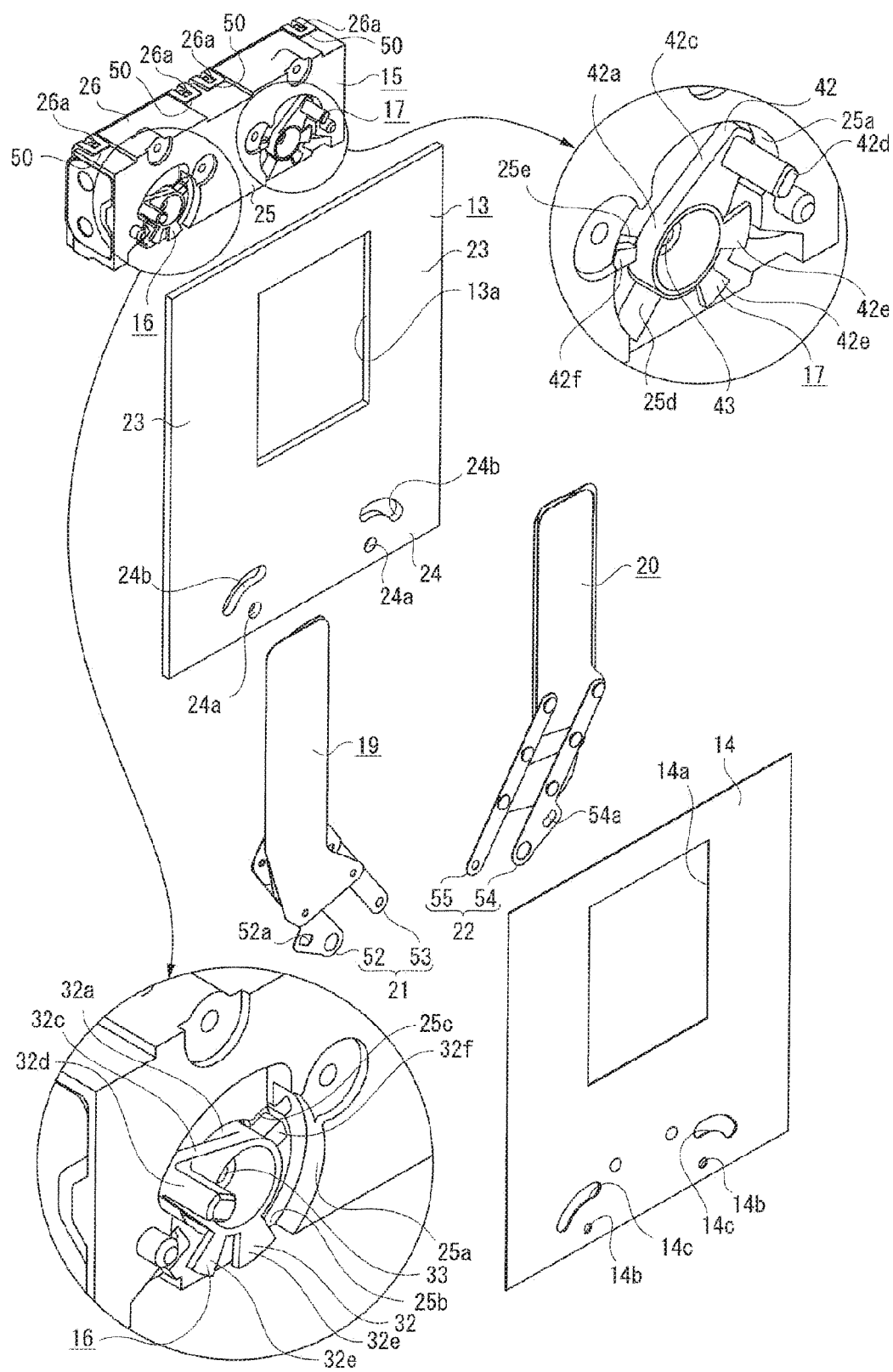
FIG. 5 is a disassembled perspective view of the blade opening and closing device, of which a part is omitted, illustrated in a state different from FIG. 4.
Figure 6:
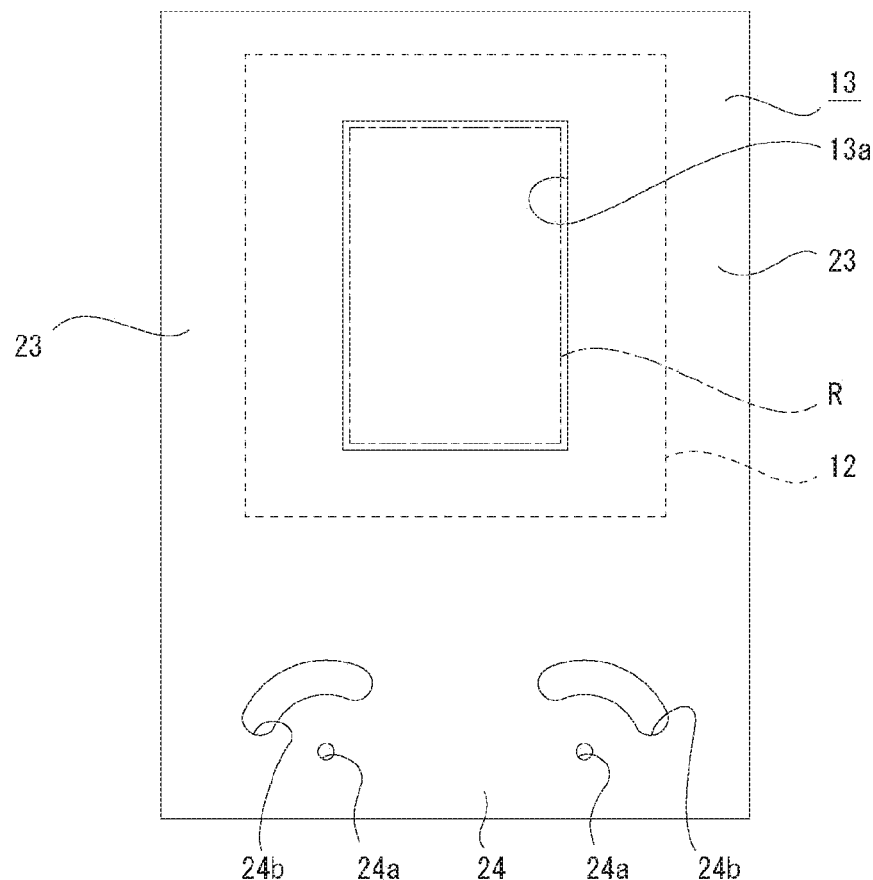
FIG. 6 is a schematic front view illustrating a relation between an opening of a base body and an effective incident region of an image pickup element.

The base body 13 is formed, for example, in a rectangular shape and has a rectangular-shaped opening 13a which passes through the base body 13 in a front and back direction (refer to FIGS. 4 and 5). As illustrated in FIG. 6, the opening 13a is formed to be slightly larger than an effective incident region R of light on an imaging surface of the image pickup element 12. The effective incident region R of light on the imaging surface is a region where light, which is taken by the optical system 10 and is necessary for generating an image, enters.

A right part and a left part of the opening 13a in the base body 13 are provided as holding parts 23 to be holding regions in which the first opening and closing blades 19 and the second opening and closing blades 20 are held at opening positions. A part lower than the opening 13a of the base body 13 is provided as a mounting part 24 to which the storage case 15 is mounted.

Pin through-holes 24a are formed in a lower end part of the mounting part 24 apart from each other in the lateral direction. Shaft moving holes 24b are formed in the mounting part 24 apart from each other in the lateral direction. The shaft moving holes 24b are formed in arc shapes having the pin through-holes 24a as a fulcrum.

The pressing plate 14 is formed in a size and a shape substantially same as the base body 13 and has a transmission hole 14a. The pressing plate 14 is attached to the base body 13 from the rear side while sandwiching the first opening and closing blades 19 and the second opening and closing blades 20 therebetween. The image pickup element 12 is arranged at the rear side of the pressing plate 14. In a state where the pressing plate 14 is attached to the base body 13, the transmission hole 14a is positioned right behind the opening 13a.

Pin fitting holes 14b are formed in a lower end part of the pressing plate 14 apart from each other in the lateral direction. Escape holes 14c are formed in the pressing plate 14 apart from each other in the lateral direction. The escape holes 14c are formed in arc shapes having the pin fitting holes 14b as a fulcrum.

The storage case 15 is formed of a non-conductive material such as a resin material and includes a rear surface part 25, a top surface part 26, and a lower surface part 27.

Through-holes 25a are formed in the rear surface part 25 apart from each other in the lateral direction. Stoppers 25b and 25c are provided in an opening edge of one through-hole 25a in the rear surface part 25 and are separated in a circumferential direction. Stoppers 25d and 25e are provided in an opening edge of the other through-hole 25a and are separated in the circumferential direction.

Engaging projections 26a are provided on an outer surface of a front end part of the top surface part 26 apart from each other in the lateral direction. Engaging projections 27a are provided on an outer surface of a front end part of the lower surface part 27 apart from each other in the lateral direction.

In the storage case 15, partition parts 28 projected forward from a center part of the rear surface part 25 in the vertical direction are provided apart from each other in the lateral direction.

An upper part and a lower part of one partition part 28 in an internal space of the storage case 15 are respectively formed as a first upper-side arrangement space 15a and a first lower-side arrangement space 15b. The first lower-side arrangement space 15b is communicated with one through-hole 25a. A space positioned outside the partition part 28 is formed at one end of the inside of the storage case 15 in the horizontal direction, and this space is formed as a first side arrangement space 15c.

An upper part and a lower part of the other partition part 28 in the internal space of the storage case 15 are respectively formed as a second upper-side arrangement space 15d and a second lower-side arrangement space 15e. The second lower-side arrangement space 15e is communicated with the other through-hole 25a. A space positioned outside the partition part 28 is formed at the other end of the inside of the storage case 15 in the horizontal direction, and this space is formed as a second side arrangement space 15f.

A space is formed between the partition parts 28 in the storage case 15, and this space is formed as a center-side arrangement space 15g.

The storage case 15 is attached to the mounting part 24 of the base body 13 from the front side. In a state where the storage case 15 has been attached to the mounting part 24, the through-holes 25a of the storage case 15 are respectively positioned on the front side of the pin through-holes 24a and the shaft moving holes 24b of the base body 13.

Figure 7:
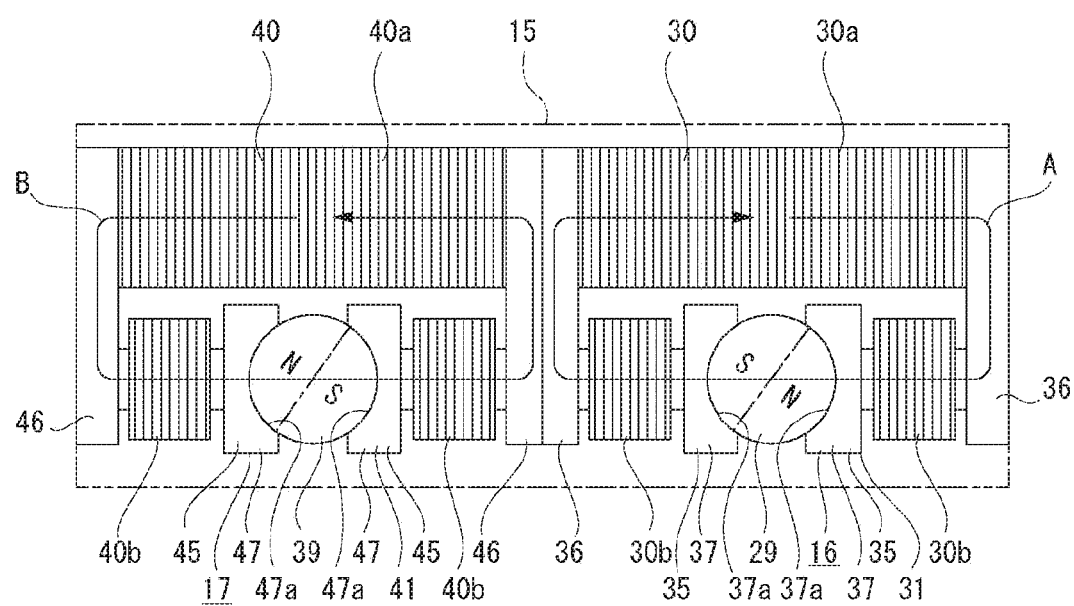
FIG. 7 is a front view of magnetic driving units.

The first magnetic driving unit 16 includes a first magnet 29, a first coil 30, and a first yoke 31 (refer to FIGS. 4, 5, and 7).

The first magnet 29 is formed in a cylindrical shape of which the axis direction is the front-back direction, and for example, the first magnet 29 is bipolar magnetized. The first magnet 29 is fixed to a first driving member 32.

The first driving member 32 includes a columnar base 32a of which the axis direction is the front-back direction, a fixing shaft 32b projected forward from the base 32a, a projected part 32c projected from the base 32a in a radiation direction, a connecting shaft 32d projected backward from a front end part of the projected part 32c, detecting pieces 32e projected from the base 32a respectively in the radiation directions, and a stopped projection part 32f projected from the base 32a in the radiation direction.

The projected part 32c, the detecting pieces 32e, and the stopped projection part 32f are positioned apart from each other in the circumferential direction.

A part of the first driving member 32 is inserted into one of the through-holes 25a, and the first driving member 32 is arranged in the first lower-side arrangement space 15b of the storage case 15 together with the first magnet 29. The connecting shaft 32d is projected backward from the storage case 15 (refer to FIG. 5). The connecting shaft 32d is inserted through one of the shaft moving holes 24b formed in the base body 13 and one of the escape holes 14c formed in the pressing plate 14, and the front end part is projected backward than the pressing plate 14. In the first driving member 32, a hole to be supported 33 opened backward is formed at a position from the base 32a to the fixing shaft 32b.

A supporting pin 70 is inserted through one of the pin fitting holes 14b formed in the pressing plate 14 and one of the pin through-holes 24a formed in the base body 13 (refer to FIG. 4). A front part of the supporting pin 70 is inserted into the hole to be supported 33 in the first driving member 32 and a rear part is inserted into the pin fitting hole 14b in the pressing plate 14 so that the supporting pin 70 is attached. Therefore, the first driving member 32 can rotate with respect to the base body 13 having the supporting pin 70 as a fulcrum, and rotation of the first driving member 32 rotates the first magnet 29 with respect to the base body 13.

The first coil 30 includes a first long-axis coil 30a positioned on the upper side and first short-axis coils 30b positioned on the lower side (refer to FIGS. 4, 5, and 7). All the axis directions of the first long-axis coil 30a and the first short-axis coils 30b are set to be the horizontal direction.

The first yoke 31 includes a first shaft-shaped yoke part 34, first opposite yoke parts 35, and first plate yoke parts 36. The first shaft-shaped yoke part 34, the first opposite yoke parts 35, and the first plate yoke parts 36 are formed of ferromagnetic materials.

The first shaft-shaped yoke part 34 is formed in a substantially round shaft shape of which the axis direction is made to be the horizontal direction.

The first opposite yoke part 35 includes an opposite part 37 formed in a substantially block-like shape and a shaft shaped part 38 projected from the opposite part 37 in a lateral direction, and a surface of the opposite part 37 opposed to the shaft shaped part 38 is formed as a circular-arc opposite surface 37a. The opposite surfaces 37a of the opposite parts 37 of the first opposite yoke parts 35 are positioned to be opposed to each other in the horizontal direction.

The first plate yoke part 36 is formed in a plate-like shape facing in the horizontal direction. The upper halves of the first plate yoke parts 36 are respectively coupled to both ends of the first shaft-shaped yoke part 34, and the lower halves of the first plate yoke parts 36 are respectively coupled to the front end parts of the shaft shaped parts 38 of the first opposite yoke parts 35.

The first shaft-shaped yoke part 34 is inserted through the first long-axis coil 30a, and the first long-axis coil 30a is held by the first shaft-shaped yoke part 34. The shaft shaped parts 38 of the first opposite yoke parts 35 are respectively inserted through the first short-axis coils 30*b*, and the first short-axis coils 30*b* are respectively held by the first opposite yoke parts 35.

In a state where the first yoke 31 holds the first long-axis coil 30*a* and the first short-axis coils 30*b*, the first shaft-shaped yoke part 34 is arranged in the first upper-side arrangement space 15*a*, the first opposite yoke parts 35 are arranged in the first lower-side arrangement space 15*b*, one first plate yoke part 36 is arranged in the first side arrangement space 15*c*, and the other first plate yoke part 36 is arranged in the center-side arrangement space 15*g*. The first yoke 31 is stored in the storage case 15 in this way.

In a state where the first coil 30 is stored in the storage case 15, one of the partition parts 28 in the storage case 15 is inserted between the first long-axis coil 30*a* and the first short-axis coils 30*b*, and the first magnet 29 is positioned between the opposite surfaces 37*a* of the opposite parts 37 of the first opposite yoke parts 35 (refer to FIG. 7). Therefore, a first magnetic circuit is formed around one of the partition parts 28 of the first magnetic driving unit 16.

The second magnetic driving unit 17 includes a second magnet 39, a second coil 40, and a second yoke 41 (refer to FIGS. 4, 5, and 7).

The second magnet 39 is formed in a cylindrical shape of which the axis direction is the front-back direction, and for example, the second magnet 39 is bipolar magnetized. The second magnet 39 is fixed to a second driving member 42.

The second driving member 42 includes a columnar base 42*a* of which the axis direction is the front-back direction, a fixing shaft 42*b* projected forward from the base 42*a*, a projected part 42*c* projected from the base 42*a* in a radiation direction, a connecting shaft 42*d* projected backward from a front end part of the projected part 42*c*, detecting pieces 42*e* projected from the base 42*a* respectively in the radiation directions, and a stopped projection part 42*f* projected from the base 42*a* in the radiation direction.

The projected part 42*c*, the detecting pieces 42*e*, and the stopped projection part 42*f* are positioned apart from each other in the circumferential direction.

A part of the second driving member 42 is inserted into the other through-hole 25*a*, and the second driving member 42 is arranged in the second lower-side arrangement space 15*e* of the storage case 15 together with the second magnet 39. The connecting shaft 42*d* is projected backward from the storage case 15 (refer to FIG. 5). The connecting shaft 42*d* is inserted through the other shaft moving hole 24*b* formed in the base body 13 and the other escape hole 14*c* formed in the pressing plate 14, and the front end part is projected backward than the pressing plate 14. In the second driving member 42, a hole to be supported 43 opened backward is formed at a position from the base 42*a* to the fixing shaft 42*b*.

The supporting pin 70 is inserted through the other pin fitting hole 14*b* formed in the pressing plate 14 and the other pin through-hole 24*a* formed in the base body 13 (refer to FIG. 4). The front part of the supporting pin 70 is inserted into the hole to be supported 43 in the second driving member 42 and the rear part is inserted into the pin fitting hole 14*b* in the pressing plate 14 so that the supporting pin 70 is attached. Therefore, the second driving member 42 can rotate with respect to the base body 13 having the supporting pin 70 as a fulcrum, and rotation of the second driving member 42 rotates the second magnet 39 with respect to the base body 13.

The second coil 40 includes a second long-axis coil 40*a* positioned on the upper side and second short-axis coils 40*b* positioned on the lower side (refer to FIGS. 4, 5, and 7). All the axis directions of the second long-axis coil 40*a* and the second short-axis coils 40*b* are set to be the horizontal direction.

The second yoke 41 includes a second shaft-shaped yoke part 44, second opposite yoke parts 45, and second plate yoke parts 46. The second shaft-shaped yoke part 44, the second opposite yoke parts 45, and the second plate yoke parts 46 are formed of ferromagnetic materials.

The second shaft-shaped yoke part 44 is formed in a substantially round shaft shape of which the axis direction is made to be the horizontal direction.

The second opposite yoke part 45 includes an opposite part 47 formed in a substantially block-like shape and a shaft shaped part 48 projected from the opposite part 47 in the lateral direction, and a surface of the opposite part 47 opposed to the shaft shaped part 48 is formed as a circular-arc opposite surface 47*a*. The opposite surfaces 47*a* of the opposite parts 47 of the second opposite yoke parts 45 are positioned to be opposed to each other in the horizontal direction.

The second plate yoke part 46 is formed in a plate-like shape facing in the horizontal direction. Upper halves of the second plate yoke parts 46 are respectively coupled to both ends of the second shaft-shaped yoke part 44, and lower halves of the second plate yoke parts 46 are respectively coupled to the front end parts of the shaft shaped parts 48 of the second opposite yoke parts 45.

The second shaft-shaped yoke part 44 is inserted through the second long-axis coil 40*a*, and the second long-axis coil 40*a* is held by the second shaft-shaped yoke part 44. The shaft shaped parts 48 of the second opposite yoke parts 45 are respectively inserted through the second short-axis coils 40*b*, and the second short-axis coils 40*b* are respectively held by the second opposite yoke parts 45.

In a state where the second yoke 41 holds the second long-axis coil 40*a* and the second short-axis coils 40*b*, the second shaft-shaped yoke part 44 is arranged in the second upper-side arrangement space 15*d*, the second opposite yoke parts 45 are arranged in the second lower-side arrangement space 15*e*, one second plate yoke part 46 is arranged in the second side arrangement space 15*f*, and the other second plate yoke part 46 is arranged in the center-side arrangement space 15*g*. The second yoke 41 is stored in the storage case 15 in this way.

In a state where the second coil 40 is stored in the storage case 15, the other partition part 28 in the storage case 15 is inserted between the second long-axis coil 40*a* and the second short-axis coils 40*b*, and the second magnet 39 is positioned between the opposite surfaces 47*a* of the opposite parts 47 of the second opposite yoke parts 45 (refer to FIG. 7). Therefore, a second magnetic circuit is formed around the other partition part 28 in the second magnetic driving unit 17.

As described above, in a state where the first magnetic driving unit 16 and the second magnetic driving unit 17 are stored and arranged in the storage case 15, the first magnetic driving unit 16 and the second magnetic driving unit 17 are aligned side by side, and the first plate yoke part 36 of the first magnetic driving unit 16 and the plate yoke part 46 of the second magnetic driving unit 17 arranged in the center-side arrangement space 15*g* are in a face contact state.

Therefore, since the first magnetic driving unit 16 and the second magnetic driving unit 17 are positioned side by side in contact with each other, an entire arrangement space of the first magnetic driving unit 16 and the second magnetic driving unit 17 in the blade opening and closing device 11 is reduced, and the blade opening and closing device 11 can be miniaturized.

Also, the plate-shaped first plate yoke parts 36 are provided as a part of the first yoke 31, and the plate-shaped second plate yoke parts 46 are provided as a part of the second yoke 41. The first plate yoke part 36 and the second plate yoke part 46 are arranged in contact with each other in the thickness direction.

Therefore, the arrangement space of the first magnetic driving unit 16 and the second magnetic driving unit 17 is reduced in the thickness direction of the first plate yoke part 36 and the second plate yoke part 46, and the blade opening and closing device 11 can be more miniaturized.

In addition, the pair of first plate yoke parts 36 and the pair of second plate yoke parts 46 are provided, and the first plate yoke parts 36 and the second plate yoke parts 46 are arranged in the same direction. The first magnet 29 and the first coil 30 are arranged between the first plate yoke parts 36, and the second magnet 39 and the second coil 40 are arranged between the second plate yoke parts 46.

Therefore, since the first plate yoke parts 36 and the second plate yoke parts 46 are aligned in the thickness direction, the blade opening and closing device 11 can be more miniaturized.

In addition, in the blade opening and closing device 11, the storage case 15 attached to the base body 13 is provided, and the first magnetic driving unit 16 and the second magnetic driving unit 17 are stored in the storage case 15.

Therefore, since it is not necessary to provide components to separately store the first magnetic driving unit 16 and the second magnetic driving unit 17, the number of components can be reduced. Also, both the first magnetic driving unit 16 and the second magnetic driving unit 17 are stored in the storage case 15. Therefore, the first magnetic driving unit 16 can be arranged to be closer to the second magnetic driving unit 17, and the blade opening and closing device 11 can be miniaturized.

In a state where the first magnetic driving unit 16 and the second magnetic driving unit 17 are stored and arranged in the storage case 15, positions of magnetic poles of the first magnet 29 and those of the second magnet 39 are opposite to each other (refer to FIG. 7). For example, when the N-pole of the first magnet 29 is positioned on the right side and the S-pole is positioned on the left side, the N-pole of the second magnet 39 is positioned on the left side and the S-pole is positioned on the right side. Conversely, it is preferable that when the N-pole of the first magnet 29 is positioned on the left side and the S-pole is positioned on the right side, the N-pole of the second magnet 39 be positioned on the right side and the S-pole be positioned on the left side.

Also, in the image pickup device 1, the currents are set to flow in a reverse direction in the first coil 30 of the first magnetic driving unit 16 and the second coil 40 of the second magnetic driving unit 17. Therefore, as illustrated in FIG. 7, a magnetic flux direction A generated in the first magnetic driving unit 16 when the current is supplied to the first coil 30 is opposite to a magnetic flux direction B generated in the second magnetic driving unit 17 when the current is supplied to the second coil 40.

In the first magnetic driving unit 16, a magnetic force is generated between the first magnet 29 and the first opposite yoke parts 35, and a rotating force in a clockwise direction or in a counterclockwise direction viewed from the front side is applied to the first magnet 29 according to the positions of the respective magnetic poles of the first magnet 29 relative to the first opposite yoke parts 35. Therefore, when the first coil 30 is not energized, the force applied to the first magnet 29 makes the stopped projection part 32f of the first driving member 32 have contact with the stopper 25b or the stopper 25c, and the first magnet 29 is held at a rotation end in the clockwise direction or the counterclockwise direction.

Also, in the second magnetic driving unit 17, a magnetic force is generated between the second magnet 39 and the second opposite yoke parts 45, and a rotating force in the clockwise direction or the counterclockwise direction viewed from the front side is applied to the second magnet 39 according to the positions of the respective magnetic poles of the second magnet 39 relative to the second opposite yoke parts 45. Therefore, when the second coil 40 is not energized, the force applied to the second magnet 39 makes the stopped projection part 42f of the second driving member 42 have contact with the stopper 25d or the stopper 25e, the second magnet 39 is held at the rotation end in the clockwise direction or the counterclockwise direction.

In a state where the first magnetic driving unit 16 and the second magnetic driving unit 17 are stored in the storage case 15 as described above, the pressing covers 18 are attached to the storage case 15. The pressing cover 18 includes a covering part 49 and engaging pieces 50 projected backward from an upper and lower ends of the covering part 49. An engagement hole 51 is formed in the engaging piece 50.

Opening edges of the engagement holes 51 of the engaging pieces 50 are engaged with the engaging projections 26a or the engaging projections 27a to attach the pressing cover 18 to the storage case 15. By attaching the pressing covers 18 to the storage case 15, the first magnetic driving unit 16 and the second magnetic driving unit 17 are pressed by the pressing covers 18 from the front side, and the first magnetic driving unit 16 and the second magnetic driving unit 17 are prevented from falling from the storage case 15.

Figure 8:
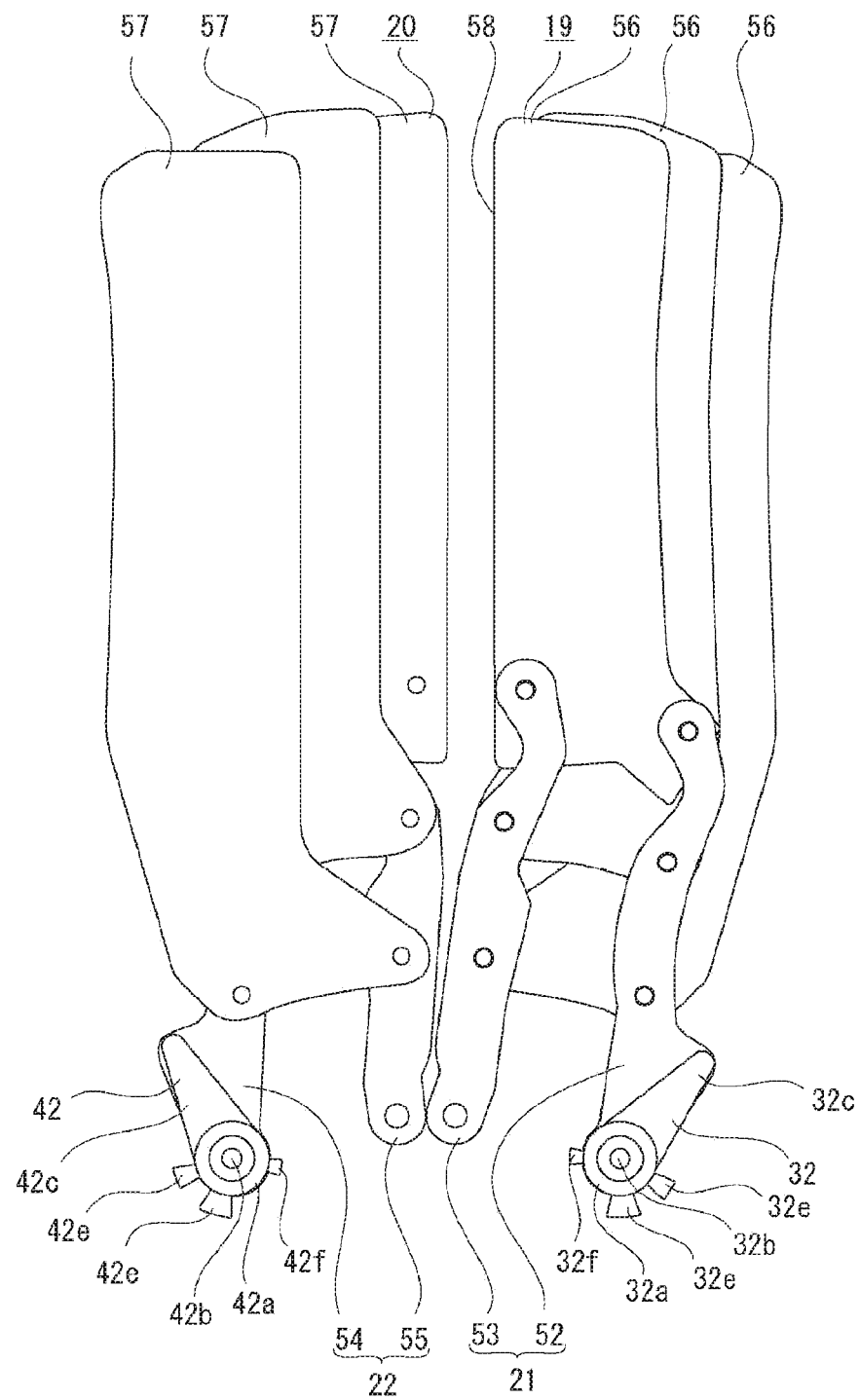
FIG. 8 is a front view of opening and closing blades and links.

The first link 21 and the second link 22 are respectively coupled to the first opening and closing blades 19 and the second opening and closing blades 20, and the first opening and closing blades 19 and the second opening and closing blades 20 are respectively coupled to the first driving member 32 and the second driving member 42 via the first link 21 and the second link 22 (refer to FIGS. 5 and 8). The first link 21 and the second link 22 are parallel links.

The first link 21 includes first arms 52 and 53 positioned apart from each other in the lateral direction, and a coupling hole 52a extending in a predetermined direction is formed at a position near the lower end of the first arm 52. The connecting shaft 32d of the first driving member 32 is slidably inserted into the coupling hole 52a of the first arm 52 to couple the first link 21 to the first driving member 32. The lower end parts of the respective first arms 52 and 53 are rotatably coupled to the lower end part of the base body 13. Also, the supporting pin 70 to be inserted through one pin through-hole 24a of the base body 13 is inserted through the lower end part of the first arm 52, and the first arm 52 rotates as having the supporting pin 70 as a fulcrum.

The second link 22 includes second arms 54 and 55 positioned apart from each other in the lateral direction, and a coupling hole 54a extending in a predetermined direction is formed at a position near the lower end of the second arm 54. The connecting shaft 42d of the second driving member 42 is slidably inserted into the coupling hole 54a of the second arm 54 to couple the second link 22 to the second driving member 42. The lower end parts of the respective second arms 54 and 55 are rotatably coupled to the lower end part of the base body 13. Also, the supporting pin 70 to be inserted through the other pin through-hole 24*a* of the base body 13 is inserted through the lower end part of the second arm 54, and the second arm 54 rotates as having the supporting pin 70 as a fulcrum.

The first opening and closing blades 19 are formed of a plurality of sheet-shaped first sectors 56. At least parts of the first sectors 56 of the first opening and closing blades 19 are positioned to be overlapped in the thickness direction, and the first opening and closing blades 19 move between the opening position where the opening 13*a* of the base body 13 is opened and the closing position where the opening 13*a* is closed.

Both right and left ends of the lower end part of each first sector 56 are rotatably coupled to the parts of the first arms 52 and 53. Therefore, when the first driving member 32 is rotated, the rotation of the first driving member 32 moves the first arms 52 and 53 while a parallel state is maintained, and the movements of the first arms 52 and 53 move the first sectors 56 in a substantially horizontal direction. At this time, moving amounts of the first sectors 56 in the substantially horizontal direction are different from each other, and the overlapped area changes according to the movement.

When the first opening and closing blades 19 have been moved to the closing position where the opening 13*a* is closed, the area where the first sectors 56 are overlapped with each other becomes the smallest, and the whole area becomes the largest. At the closing position, the stopped projection part 32*f* of the first driving member 32 has contact with the stopper 25*b* of the storage case 15, and the first magnet 29 is held at the rotation end in the counterclockwise direction.

Figure 9:
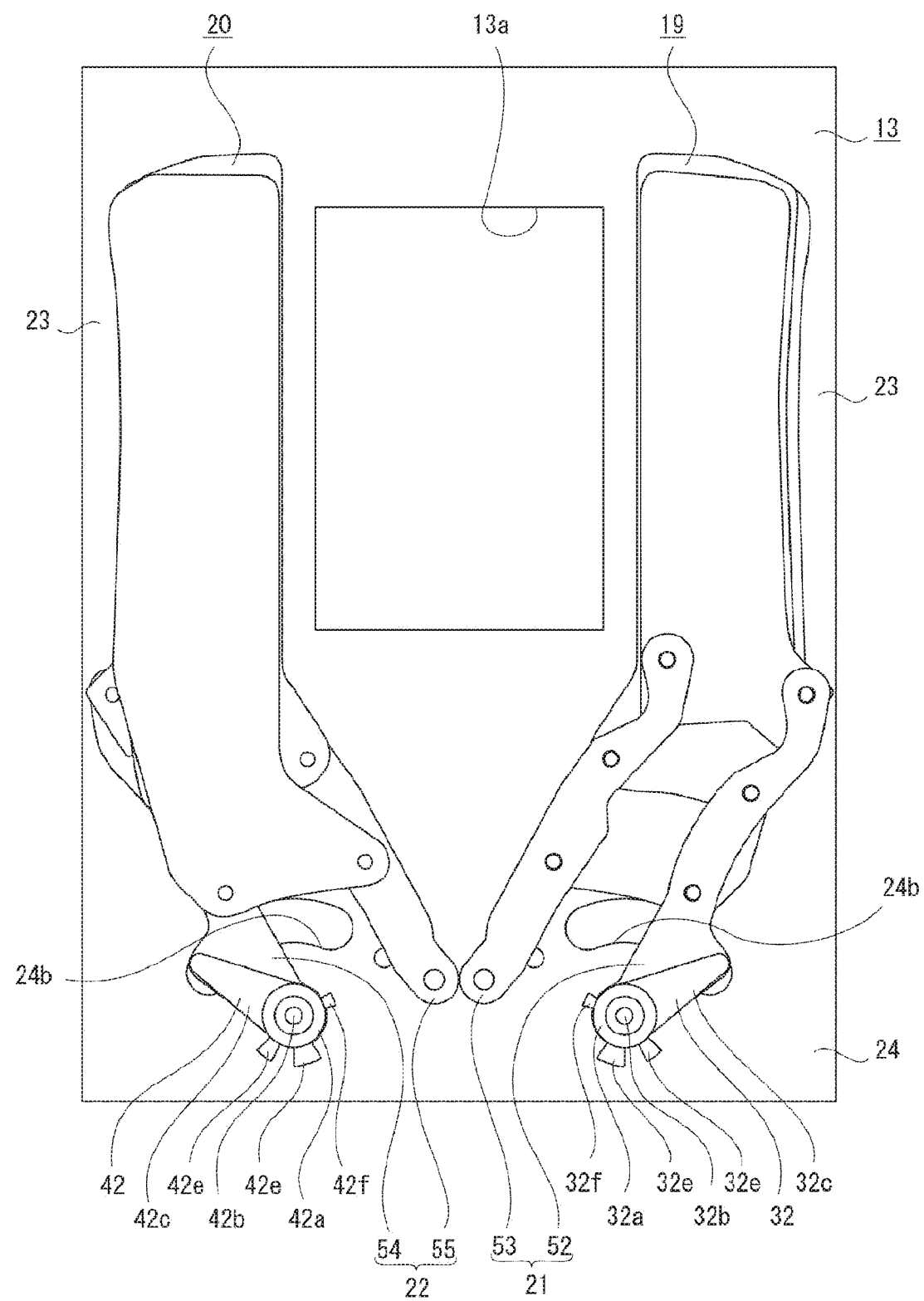
FIG. 9 is a front view of the opening and closing blades in a state where the opening and closing blades are held at an opening position.

Conversely, when the first magnet 29 is held at the rotation end in the clockwise direction, the first opening and closing blades 19 are held at the opening position (refer to FIG. 9). At the opening position, the area where the first sectors 56 are overlapped with each other becomes the largest, and the whole area becomes the smallest. Also, the first sectors 56 are positioned in one of the holding parts 23 of the base body 13.

The second opening and closing blades 20 are formed of a plurality of sheet-shaped second sectors 57 (refer to FIGS. 8 and 9). At least parts of the second sectors 57 of the second opening and closing blades 20 are positioned to be overlapped in the thickness direction, and the second opening and closing blades 20 move between the opening position where the opening 13*a* of the base body 13 is opened and the closing position where the opening 13*a* is closed.

Both right and left ends of the lower end parts of each second sector 57 are rotatably coupled to the parts of the second arms 54 and 55. Therefore, when the second driving member 42 is rotated, the rotation of the second driving member 42 moves the second arms 54 and 55 while a parallel state is maintained, and the movements of the second arms 54 and 55 move the second sectors 57 in a substantially horizontal direction. At this time, the moving amounts of the second sectors 57 in the substantially horizontal direction are different from each other, and the overlapped area changes according to the movement.

When the second opening and closing blades 20 have been moved to the closing position where the opening 13*a* is closed, the area where the second sectors 57 are overlapped with each other becomes the smallest, and the whole area becomes the largest. At the closing position, the stopped projection part 42*f* of the second driving member 42 has contact with the stopper 25*d*, and the second magnet 39 is held at the rotation end in the counterclockwise direction.

Conversely, when the second magnet 39 is held at the rotation end in the counterclockwise direction, the second opening and closing blades 20 are held at the opening position (refer to FIG. 9). At the opening position, the area where the second sectors 57 are overlapped with each other becomes the largest, and the whole area becomes the smallest. Also, the second sectors 57 are positioned in the other holding part 23 of the base body 13.

In this way, the first opening and closing blades 19 and the second opening and closing blades 20 move between the opening position where the opening 13*a* is opened and the closing position where the opening 13*a* is closed, and the overlapped area becomes larger according to the movement of the first sectors 56 and the second sectors 57 from the closing position to the opening position.

Therefore, the arrangement space of the first opening and closing blades 19 and the second opening and closing blades 20 is reduced at the opening position, and the area of the first opening and closing blades 19 and the second opening and closing blades 20 becomes larger at the closing position. The blade opening and closing device 11 can be miniaturized in the movement directions of the first opening and closing blades 19 and the second opening and closing blades 20, and the opening 13*a* having a sufficient size can be formed.

A first sheet which is not shown is arranged between the first opening and closing blades 19 and the second opening and closing blades 20, and the first sheet prevents a contact between the first opening and closing blades 19 and the second opening and closing blades 20 and smooths the movements of the first opening and closing blades 19 and the second opening and closing blades 20.

Also, a second sheet which is not shown is arranged between the second opening and closing blades 20 and the pressing plate 14, and the second sheet smooths the movements of the second opening and closing blades 20.

Movement of blade opening and closing device Movement of the blade opening and closing device 11 is described below (refer to FIGS. 10 to 14).

Figure 10:
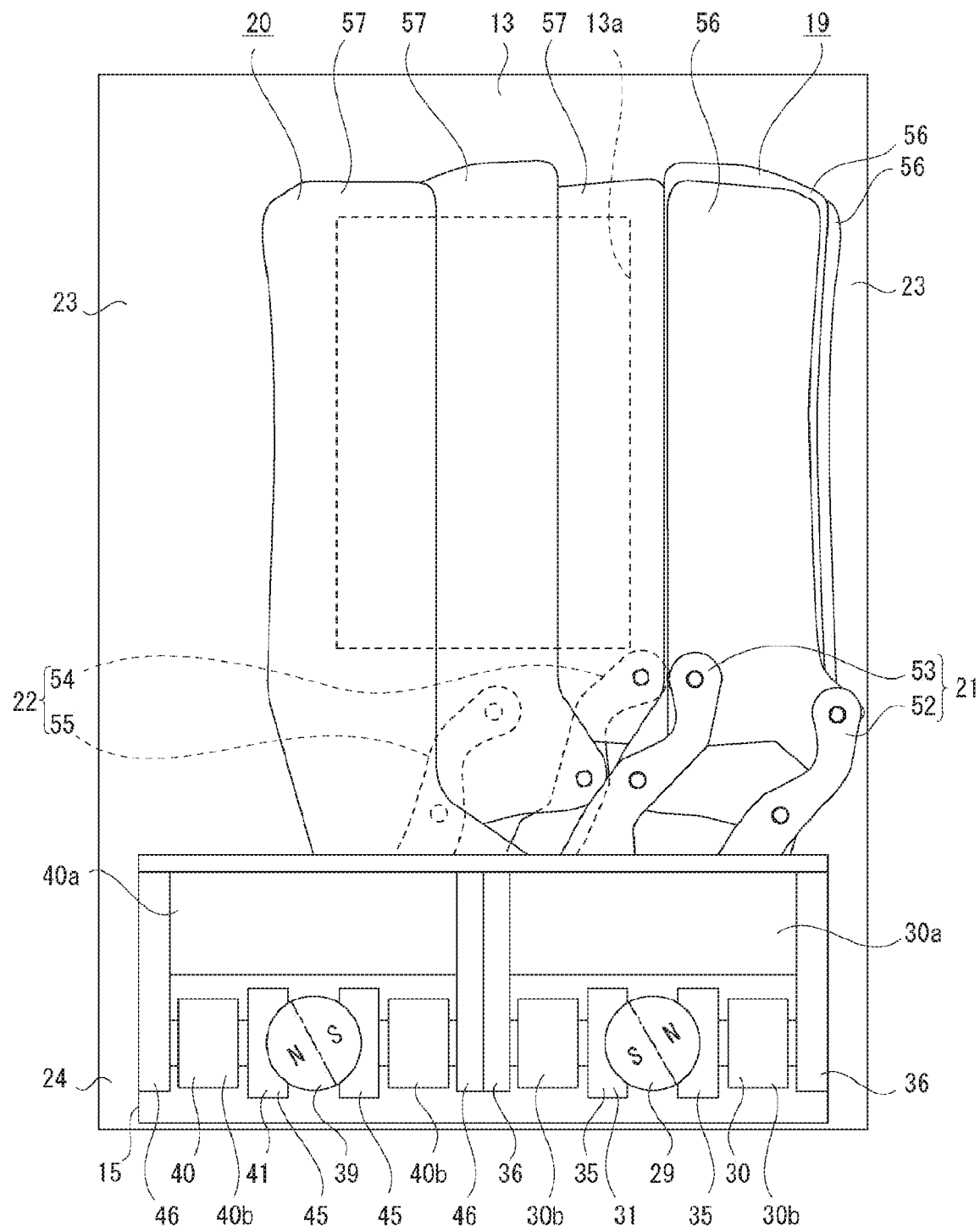
FIG. 10 is a view of movement of the blade opening and closing device which is also illustrated in FIGS. 11 to 14.
Figure 11:
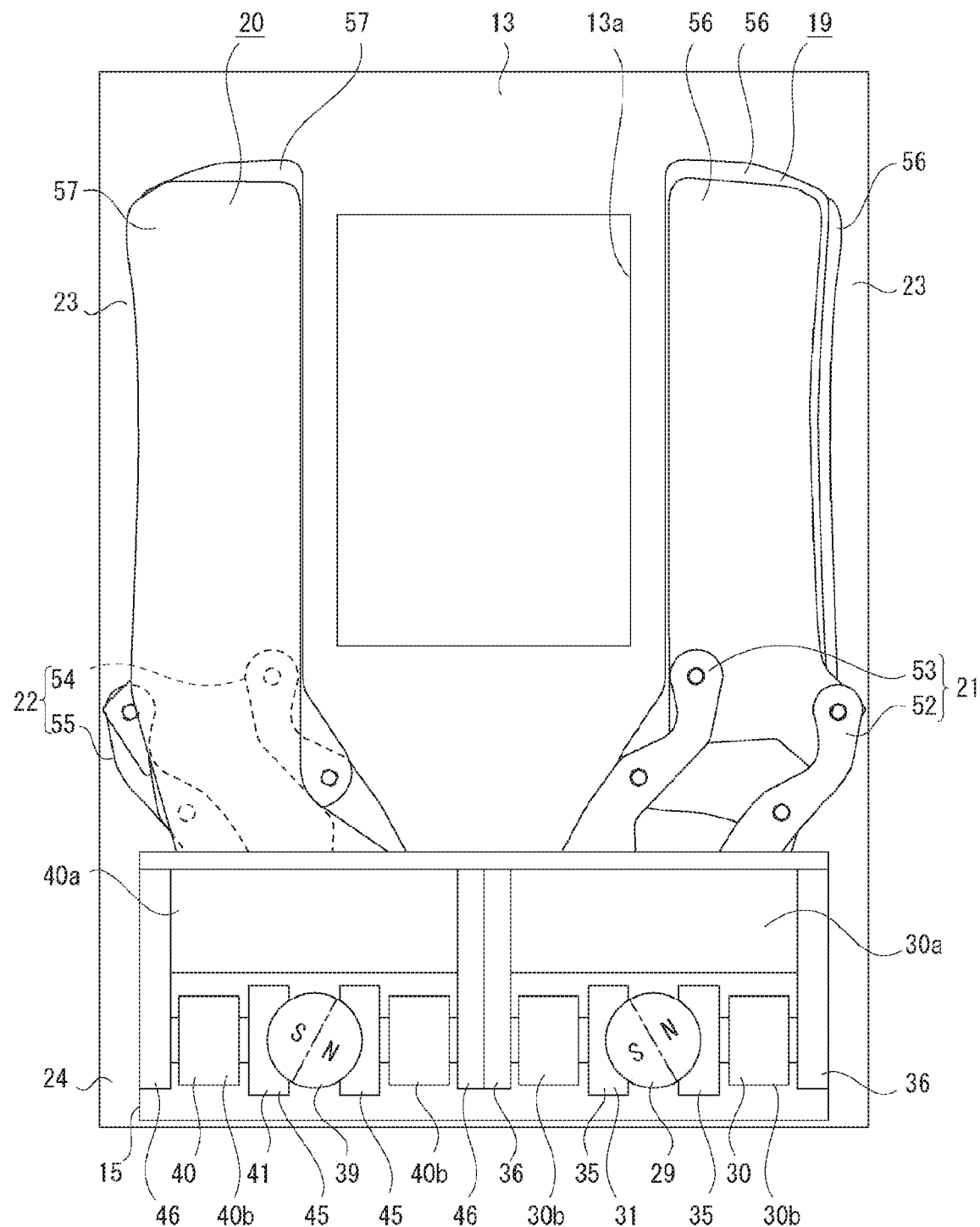
FIG. 11 is a front view of the first opening and closing blades and the second opening and closing blades at the opening positions.
Figure 12:
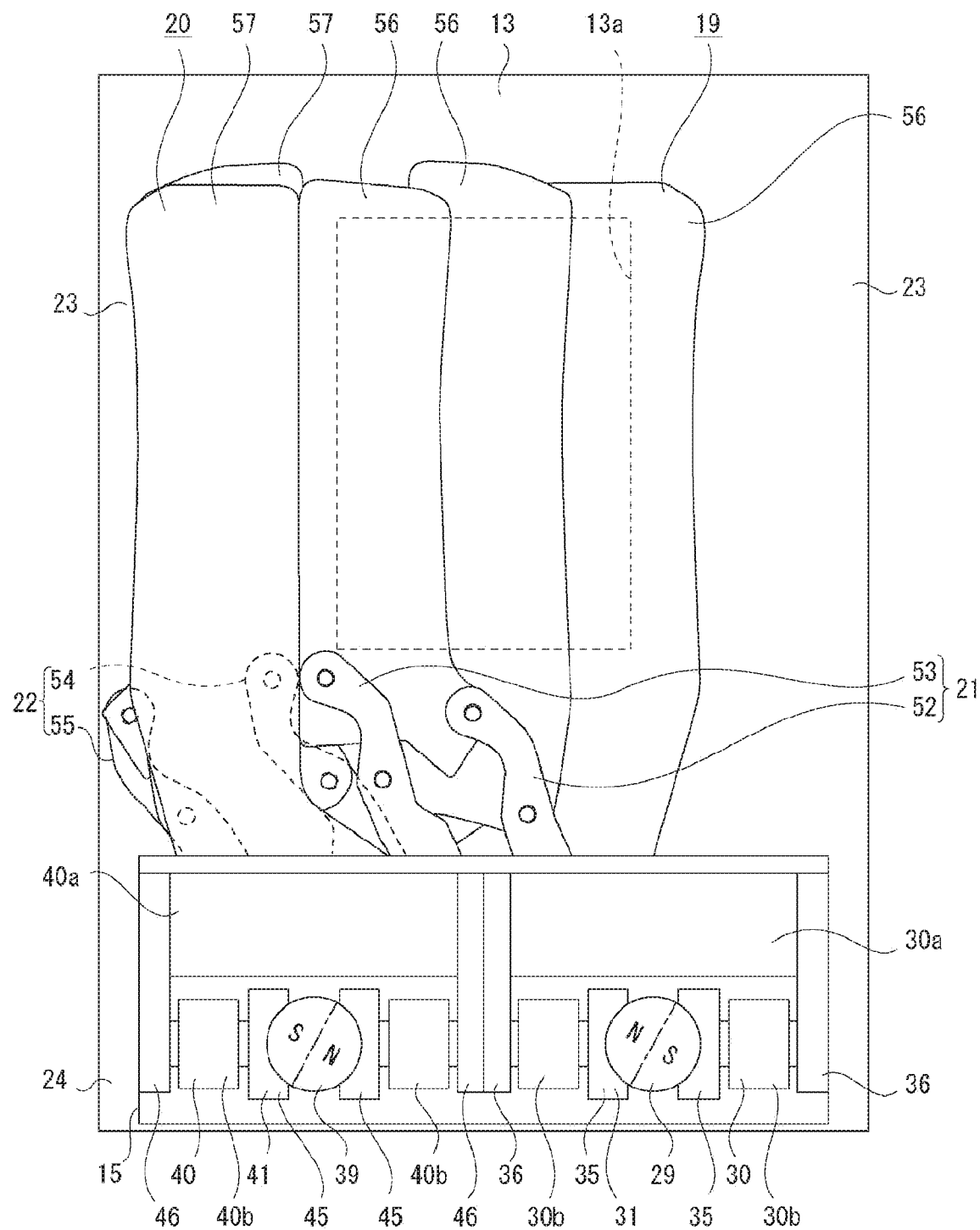
FIG. 12 is a front view of the first opening and closing blades positioned at the closing position and the second opening and closing blades positioned at the opening position.
Figure 13:
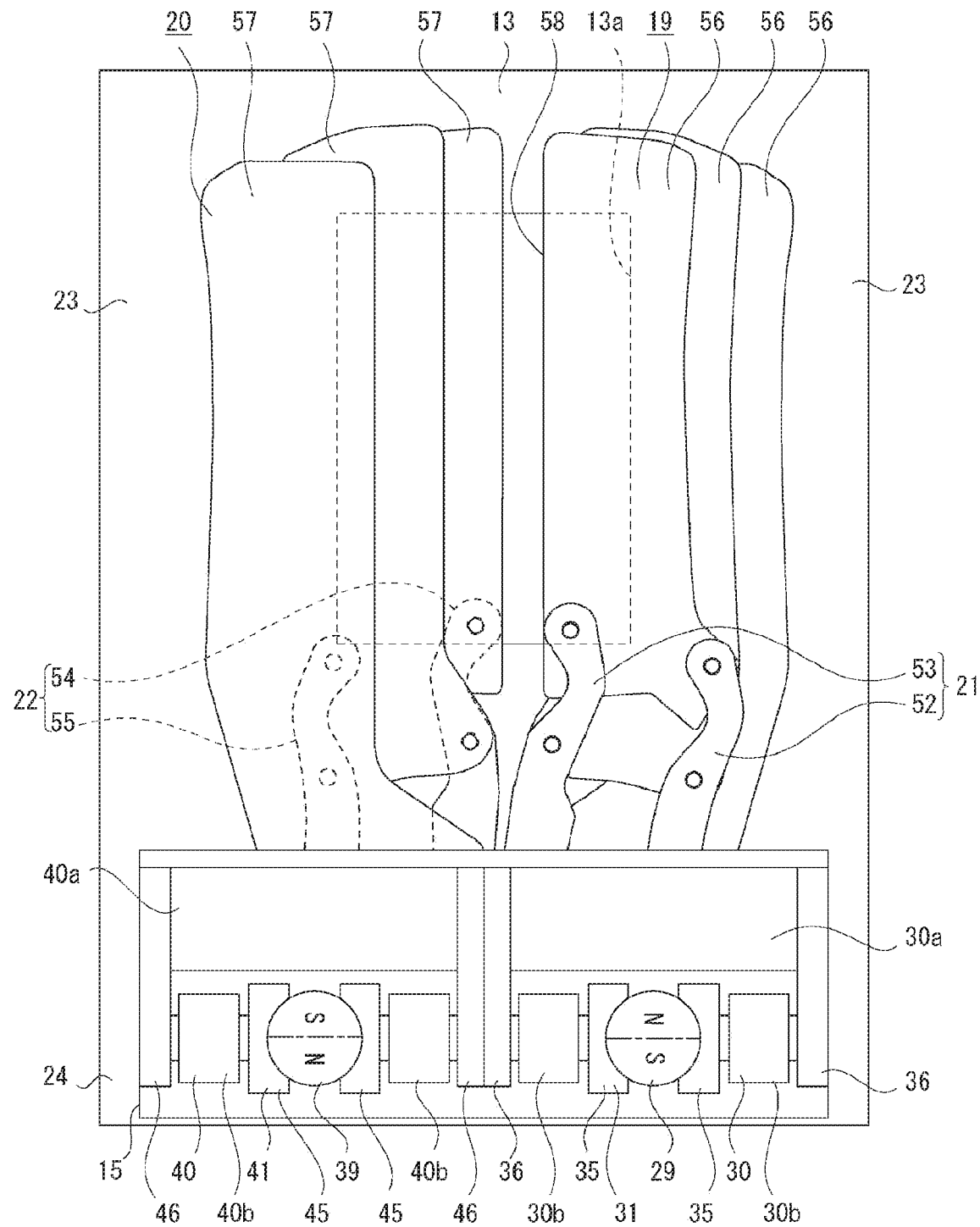
FIG. 13 is a front view of the opening and closing blades for performing slit travel.
Figure 14:
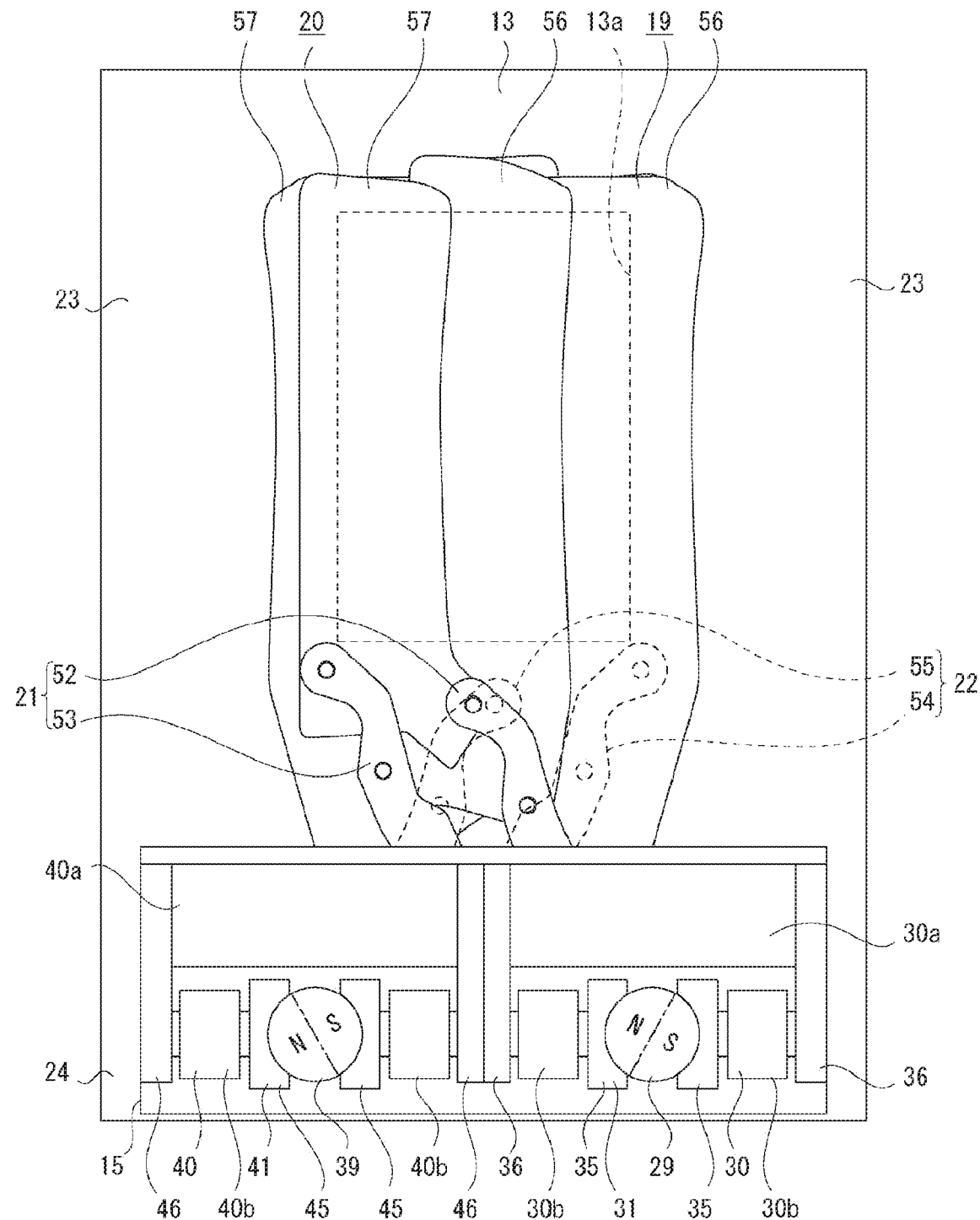
FIG. 14 is a front view of the first opening and closing blades and the second opening and closing blades positioned at the closing positions.

First, a state of the first opening and closing blades 19 and the second opening and closing blades 20 before the power button 6 of the image pickup device 1 is operated is described (refer to FIG. 10).

In a state before the power button 6 of the image pickup device 1 is operated, the first coil 30 and the second coil 40 are not energized. For example, the first opening and closing blades 19 are held at the opening position, and the second opening and closing blades 20 are held at the closing position. Therefore, the opening 13*a* of the base body 13 is closed by the second opening and closing blades 20.

Furthermore, in the blade opening and closing device 11, as described above, when the first opening and closing blades 19 and the second opening and closing blades 20 are at the opening positions or the closing positions, the stopped projection part 32*f* of the first driving member 32 or the stopped projection part 42*f* of the second driving member 42 is pressed against any one of the stoppers 25*b*, 25*c*, 25*d*, and 25*e* by a magnetic force. Therefore, when the first opening and closing blades 19 and the second opening and closing blades 20 are moved from the opening position to the closing position or from the closing position to the opening position, the current is supplied to the first coil 30 or the second coil 40 to move the first opening and closing blades 19 and the second opening and closing blades 20.

Also, when the first opening and closing blades 19 and the second opening and closing blades 20 are moved, a position detecting sensor which is not shown detects positions of the detecting pieces 32*e* and 42*e*, and the positions of the first driving member 32 and the second driving member 42 are determined. On the basis of the determination result, the positions of the first driving member 32 and the second driving member 42 are controlled.

When the power button 6 of the image pickup device 1 is operated, for example, a mode of the image pickup device 1 is set to a live view mode in which a photographer can visually recognize an object through the display 7 and the finder 9. At this time, the current is supplied to the second coil 40, and a driving force is generated in the second magnetic driving unit 17. Then, the second opening and closing blades 20 are moved from the closing position to the opening position (refer to FIG. 11).

According to the movement of the second opening and closing blades 20 to the opening position, the opening 13a is opened, and light taken from the optical system 10 can enter the image pickup element 12. In this state, the photographer can visually recognize the object through the display 7 and the finder 9. The second opening and closing blades 20 are positioned at the other holding part 23 of the base body 13.

Next, when the shutter button 4 is operated and the object is photographed, the current is supplied to the first coil 30, and a driving force is generated in the first magnetic driving unit 16. Then, the first opening and closing blades 19 is moved from the opening position to the closing position, and the opening 13a is closed (refer to FIG. 12).

When the first opening and closing blades 19 are moved to the closing position, the current in the reverse direction is supplied to the first coil 30, and the first opening and closing blades 19 are moved from the closing position toward the opening position. When the first opening and closing blades 19 are moved toward the opening position, the current in the reverse direction is supplied to the second coil 40 immediately after the start of the movement of the first opening and closing blades 19 to the opening position, the second opening and closing blades 20 are moved from the opening position toward the closing position so as to follow the first opening and closing blades 19. When the second opening and closing blades 20 are moved as following the first opening and closing blades 19, a slit 58 having a predetermined width is formed between the first opening and closing blades 19 and the second opening and closing blades 20 (refer to FIG. 13). In a state where the slit 58 having a certain width is formed, the first opening and closing blades 19 and the second opening and closing blades 20 are moved to the opening position or the closing position.

The movement of the first opening and closing blades 19 and the second opening and closing blades 20 in a state where the slit 58 is formed is referred to as slit travel. The slit travel makes the light sequentially enter the image pickup element 12 from one end to the other end through the transmission hole 14a, the slit 58, and the opening 13a, and exposure is performed.

When the slit travel ends, the first opening and closing blades 19 are moved to the opening position and positioned in one holding part 23 of the base body 13, and the second opening and closing blades 20 are moved to the closing position to close the opening 13a again (refer to FIG. 10).

Subsequently, the current is supplied to the first coil 30, and the first opening and closing blades 19 are moved to the closing position. Then, the first opening and closing blades 19 and the second opening and closing blades 20 close the opening 13a (refer to FIG. 14). In a state where the first opening and closing blades 19 and the second opening and closing blades 20 close the opening 13a, the light entered the image pickup element 12 at the time of the slit travel is sequentially photoelectrically converted to generate an image signal. After that, the generated image signal is transferred to a memory, and an image of the object is generated.

Furthermore, the operation for sequentially photoelectrically converting the light entered the image pickup element 12 at the time of the slit travel and transferring the image signal to the memory may be performed in a state where the opening 13a is closed by moving the first opening and closing blades 19 at the time when the slit travel ends to the opening position and moving the second opening and closing blades 20 to the closing position (refer to FIG. 10).

SUMMARY

As described above, the blade opening and closing device 11 includes the first magnetic driving unit 16 including the first magnet 29 and the first coil 30, the second magnetic driving unit 17 including the second magnet 39 and the second coil 40, the first opening and closing blades 19 moved by the first magnetic driving unit 16, and the second opening and closing blades 20 moved by the second magnetic driving unit 17. The magnetic flux direction of the first magnetic driving unit 16 is opposite to that of the second magnetic driving unit 17.

In this way, the magnetic flux direction of the first magnetic driving unit 16 is opposite to that of the second magnetic driving unit 17. Therefore, as in a case where the magnetic flux directions of the two magnetic driving units are the same, phenomenon does not occur that the magnetic flux is saturated and the magnetic flux generated when one magnetic driving unit is driven enters the magnetic circuit of the other magnetic driving unit and an induction voltage which prevents the movement of the other magnetic driving unit due to the drive of one magnetic driving unit is generated.

Therefore, the effect for preventing the movement of one of the first magnetic driving unit 16 and the second magnetic driving unit 17 by the drive of the other magnetic driving unit, and the torque of the first magnetic driving unit 16 or the second magnetic driving unit 17 is not reduced. Therefore, the movements of the first opening and closing blades 19 and the second opening and closing blades 20 can be appropriately controlled.

Also, the magnetic flux direction of the first magnetic driving unit 16 is opposite to that of the second magnetic driving unit 17. Therefore, during the slit travel, when the magnetic flux generated by the drive of the first magnetic driving unit 16 enters the magnetic circuit of the second magnetic driving unit 17, the induction voltage for facilitating the movement of the second magnetic driving unit 17 is generated in the second coil 40.

Therefore, since the current to be supplied to the second coil 40 at the time of driving the second magnetic driving unit 17 is superimposed, the torque of the second magnetic driving unit 17 can be increased.

Figure 15:
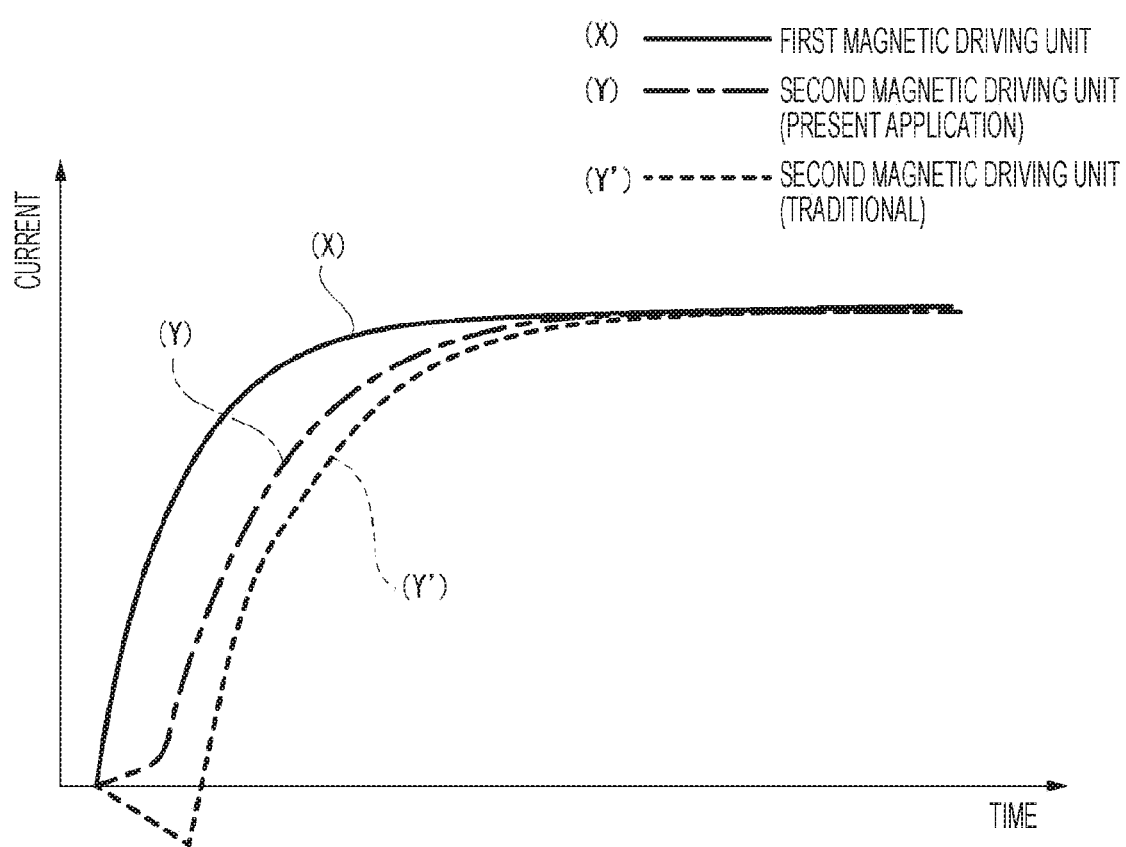
FIG. 15 is a graph of a rise time at the time when a current is supplied to a first magnetic driving unit and a second magnetic driving unit during the slit travel.

FIG. 15 is a graph of a rise time at the time when the current is supplied to the first magnetic driving unit 16 and the second magnetic driving unit 17 during the slit travel. In FIG. 15, (X) indicates the first magnetic driving unit 16, and (Y) indicates the second magnetic driving unit 17 of which the magnetic flux direction is opposite to that of the first magnetic driving unit 16. In addition, (Y') indicates a traditional second magnetic driving unit of which the magnetic flux direction is the same as that of the first magnetic driving unit 16.

As illustrated in FIG. 15, regarding the second magnetic driving unit 17 of which the magnetic flux direction is opposite to that of the first magnetic driving unit 16, the rise time is short due to the increase in the torque. Regarding the traditional second magnetic driving unit of which the magnetic flux direction is the same as that of the first magnetic driving unit 16, the rise time takes long due to the decrease in the torque.

Figure 16:
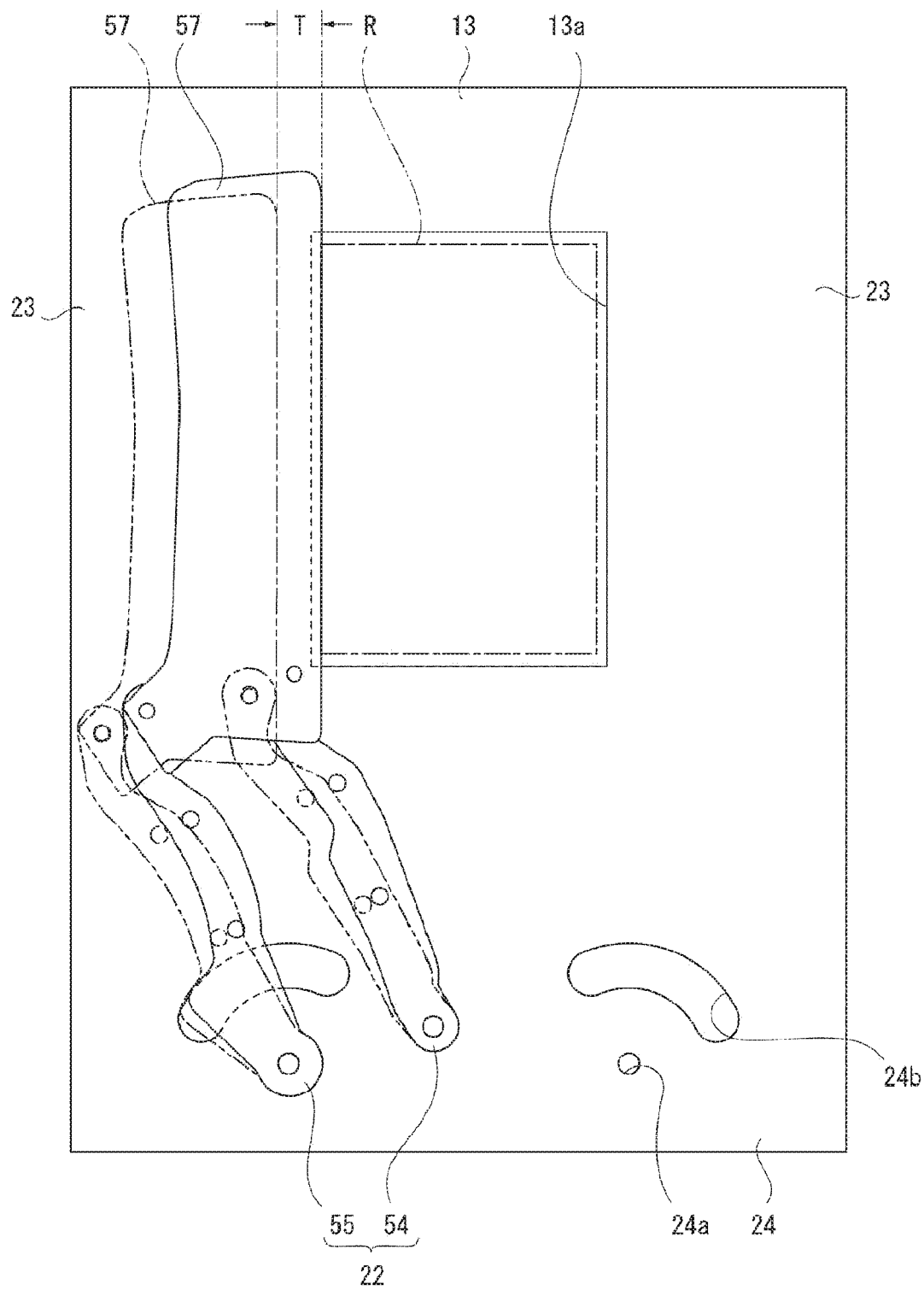
FIG. 16 is a schematic front view to describe a face exposing time.

Therefore, the magnetic flux direction of the first magnetic driving unit 16 is opposite to that of the second magnetic driving unit 17 so that the rise time of the second magnetic driving unit 17 becomes shorter. As illustrated in FIG. 16, a face exposing time T in which the second opening and closing blades 20 is moved from the opening position to the effective incident region R of the image pickup element 12 can be shorter, and the moving speed of the second opening and closing blades 20 can be increased.

Also, since the drive of one of the first magnetic driving unit 16 and the second magnetic driving unit 17 does not cause an effect to prevent the movement of the other magnetic driving unit, it is not necessary to position the first magnetic driving unit 16 and the second magnetic driving unit 17 apart from each other to avoid the above effect. Therefore, the first magnetic driving unit 16 and the second magnetic driving unit 17 can be arranged close to each other, and the blade opening and closing device 11 can be miniaturized.

In addition, the drive of one of the first magnetic driving unit 16 and the second magnetic driving unit 17 does not cause the effect for preventing the movement of the other driving unit, and the torque is not decreased. Therefore, for that amount, the power supply to the blade opening and closing device 11 can be reduced, and the power consumption can be reduced.

1 u 2]

In addition, also, in the blade opening and closing device 11, each of the first magnet 29 and the second magnet 39 is bipolar magnetized, and the positional relation of the N-pole and the S-pole of the first magnet 29 is opposite to that of the second magnet 39. Accordingly, the magnetic flux direction of the first magnetic driving unit 16 becomes opposite to that of the second magnetic driving unit 17.

Therefore, the configurations of the first magnet 29 and the second magnet 39 are simplified, and the structures of the first magnetic driving unit 16 and the second magnetic driving unit 17 are simplified. The movements of the first opening and closing blades 19 and the second opening and closing blades 20 can be appropriately controlled.

Also, in the blade opening and closing device 11, the first magnetic driving unit 16 and the second magnetic driving unit 17 are aligned in a state where the axis directions of the first coil 30 and the second coil 40 become the same.

Therefore, the whole size of the first magnetic driving unit 16 and the second magnetic driving unit 17 can be reduced in a direction perpendicular to the direction in which the first magnetic driving unit 16 and the second magnetic driving unit 17 are aligned. After the miniaturization in a predetermined direction, the movements of the first opening and closing blades 19 and the second opening and closing blades 20 can be appropriately controlled.

Furthermore, in the above description, an example has been indicated in which the positional relation of the N-pole and the S-pole of the first magnet 29 is opposite to that of the second magnet 39, the current flows the first coil 30 and the second coil 40 in opposite directions from each other, and accordingly, the magnetic flux direction of the first magnetic driving unit 16 is opposite to that of the second magnetic driving unit 17.

However, a method for making the configuration in which the magnetic flux direction of the first magnetic driving unit 16 is opposite to that of the second magnetic driving unit 17 is not limited to the method using the positional relation of the N-pole and the S-pole and the current flow direction. Other methods may be used to make the magnetic flux direction of the first magnetic driving unit 16 be opposite to that of the second magnetic driving unit 17.

Also, in the above description, an example has been indicated in which the second opening and closing blades 20 are moved to follow the first opening and closing blades 19 so as to perform the slit travel. Conversely, the first opening and closing blades 19 may be moved to follow the second opening and closing blades 20 so as to perform the slit travel.

Modification

Figure 17:
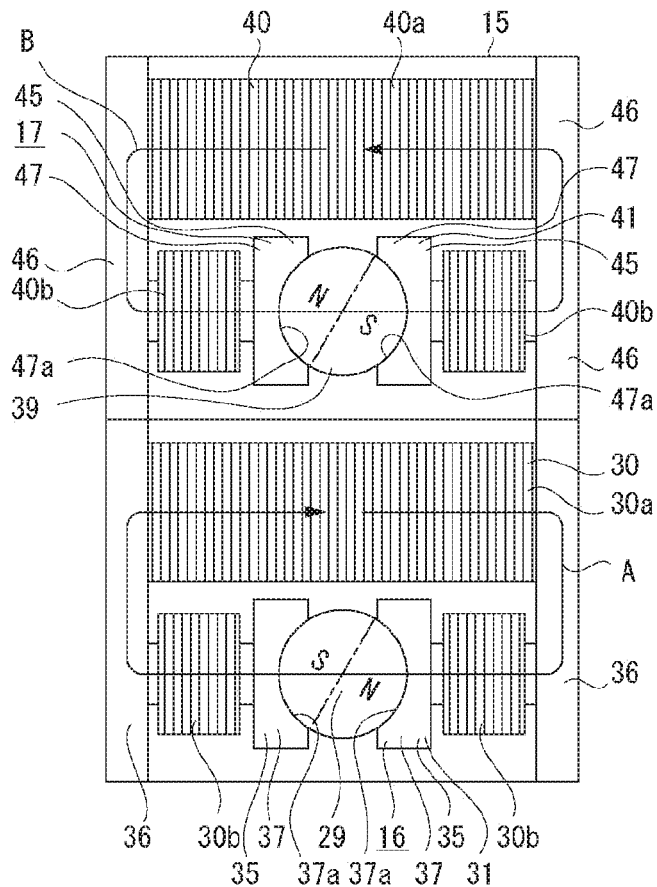
FIG. 17 is a view of a first modification.

Modifications of the configurations of the first magnetic driving unit and the second magnetic driving unit and the positional relation are described below (refer to FIGS. 17 and 18).

In the above description, an example has been indicated in which the first magnetic driving unit 16 and the second magnetic driving unit 17 are aligned in the longitudinal direction (horizontal direction). However, a first modification is an example in which the first magnetic driving unit 16 and the second magnetic driving unit 17 are aligned in a direction perpendicular to the longitudinal direction (refer to FIG. 17).

In the first modification, a magnetic flux direction A generated in the first magnetic driving unit 16 when the current is supplied to the first coil 30 is opposite to a magnetic flux direction B generated in the second magnetic driving unit 17 when the current is supplied to the second coil 40. Therefore, the effects similar to those described above can be obtained, and the movements of the first opening and closing blades 19 and the second opening and closing blades 20 can be appropriately controlled.

Figure 18:
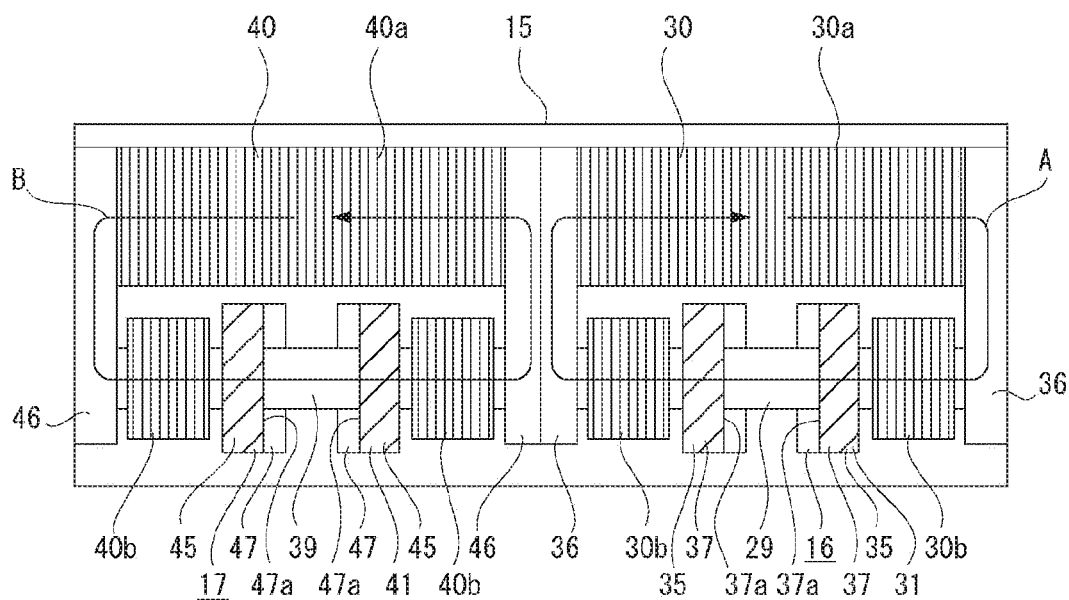
FIG. 18 is a view of a second modification.

A second modification is an example in which although the first magnetic driving unit 16 and the second magnetic driving unit 17 are aligned in the longitudinal direction, the first long-axis coil 30a and the first short-axis coils 30b are aligned in the axis direction of the first magnet 29, and the second long-axis coil 40a and the second short-axis coils 40b are aligned in the axis direction of the second magnet 39 (refer to FIG. 18).

Also, in the second modification, the magnetic flux direction A generated in the first magnetic driving unit 16 when the current is supplied to the first coil 30 is opposite to the magnetic flux direction B generated in the second magnetic driving unit 17 when the current is supplied to the second coil 40. Therefore, the effects similar to those described above can be obtained, and the movements of the first opening and closing blades 19 and the second opening and closing blades 20 can be appropriately controlled.

Also, in the first and second modifications, the first magnetic driving unit 16 and the second magnetic driving unit 17 are aligned in a state where the direction perpendicular to the axis direction of the first coil 30 becomes the same as the direction perpendicular to the axis direction of the second coil 40.

Therefore, the whole size of the first magnetic driving unit 16 and the second magnetic driving unit 17 can be reduced in a direction perpendicular to the direction in which the first magnetic driving unit 16 and the second magnetic driving unit 17 are aligned. After the miniaturization in a predetermined direction, the movements of the first opening and closing blades 19 and the second opening and closing blades 20 can be appropriately controlled.

In addition, in the second modification, the first magnetic driving unit 16 and the second magnetic driving unit 17 are aligned in a state where a rotation axis direction of the first magnet 29 becomes the same as that of the second magnet 39.

Therefore, the whole size of the first magnetic driving unit 16 and the second magnetic driving unit 17 can be reduced in the direction perpendicular to the rotation axis directions of the first magnet 29 and the second magnet 39. After the miniaturization in a predetermined direction, the movements of the first opening and closing blades 19 and the second opening and closing blades 20 can be appropriately controlled.

One Embodiment of Image Pickup Device

Figure 19:
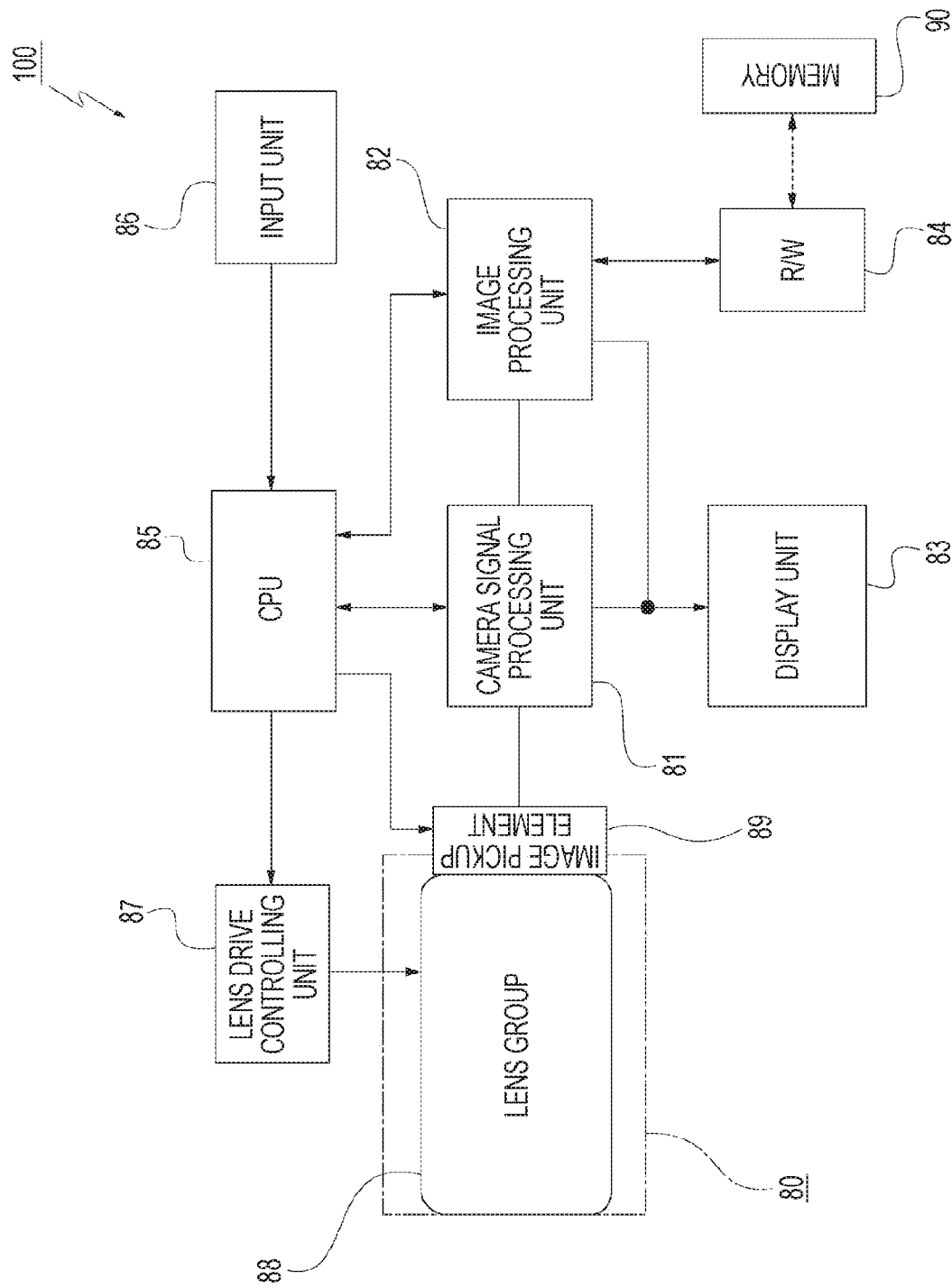
FIG. 19 is a block diagram of the image pickup device.

A block diagram of a still camera (digital still camera) according to one embodiment of the image pickup device of the present technology is illustrated in FIG. 19.

An image pickup device (digital still camera) 100 (image pickup device 1) includes a camera block 80 which plays an imaging function, a camera signal processing unit 81 which performs signal processing such as analog-digital conversion of the imaged image signal, and an image processing unit 82 which performs recording/reproducing processing of the image signal. Also, the image pickup device 100 includes a display unit 83 (display 7) which displays the imaged image and the like, a reader/writer (R/W) 84 which writes and reads the image signal to and from a memory 90, a central processing unit (CPU) 85 which controls the whole image pickup device 100, input units 86 (shutter button 4, zoom switch 5, power button 6, and operation parts 8) such as various switches to which a predetermined operation is performed by a user, and a lens drive controlling unit 87 which controls drive of lenses arranged in the camera block 80.

The camera block 80 includes an optical system (optical system 10) including a lens group 88, and an image pickup element 89 (image pickup element 12) such as a charge coupled device (CCD) and a complementary metal-oxide semiconductor (CMOS).

The camera signal processing unit 81 performs various signal processing to an output signal from the image pickup element 89 such as conversion into a digital signal, noise elimination, image quality correction, and conversion into a luminance and chrominance signal.

The image processing unit 82 performs compression encoding and expansion decoding processing to the image signal based on a predetermined image data format and conversion processing of a data specification such as a resolution.

The display unit 83 has a function to display various data such as an operation state relative to the input unit 86 by the user and an imaged image.

The R/W 84 writes the image data encoded by the image processing unit 82 to the memory 90 and reads the image data recorded in the memory 90.

The CPU 85 functions as a control processing unit for controlling each circuit block provided in the image pickup device 100 and controls each circuit block on the basis of an instruction input signal and the like from the input unit 86.

The input unit 86 outputs the instruction input signal according to the operation by the user to the CPU 85.

The lens drive controlling unit 87 controls a motor, which is not shown, for driving each lens of the lens group 88 on the basis of a control signal from the CPU 85.

The memory 90 is, for example, a semiconductor memory which can be attached/detached to a slot connected to the R/W 84.

An operation of the image pickup device 100 is described below.

In a photographing standby state, under the control by the CPU 85, an image signal imaged by the camera block 80 is output to the display unit 83 via the camera signal processing unit 81, and the image signal is displayed as a camera through image. Also, when the instruction input signal for zooming is input from the input unit 86, the CPU 85 outputs the control signal to the lens drive controlling unit 87, and a predetermined lens of the lens group 88 is moved on the basis of the control by the lens drive controlling unit 87.

When a shutter (blade opening and closing device 11) of the camera block 80 is moved in response to the instruction input signal from the input unit 86, the photographed image signal is output from the camera signal processing unit 81 and the image processing unit 82, and compression encoding is performed to the image signal. Then, the image signal is converted into digital data of a predetermined data format. The converted data is output to the R/W 84 and is written in the memory 90.

Focusing is performed by moving a predetermined lens of the lens group 88 by the lens drive controlling unit 87 on the basis of the control signal from the CPU 85.

When the image data recorded in the memory 90 is reproduced, predetermined image data is read from the memory 90 by the R/W 84 in response to the operation to the input unit 86, and the image processing unit 82 performs decompression decoding processing. After that, a reproduced image signal is output to the display unit 83, and a reproduced image is displayed.

The Present Technology

The present technology can be configured as follows.

(1)

A blade opening and closing device including:

a base body configured to include an opening for transmitting light;

a first magnetic driving unit configured to include a first magnet and a first coil;

a second magnetic driving unit configured to include a second magnet and a second coil;

first opening and closing blades configured to be moved by the first magnetic driving unit relative to the base body and to open and close the opening; and second opening and closing blades configured to be moved by the second magnetic driving unit relative to the base body and to open and close the opening, wherein a magnetic flux direction of the first magnetic driving unit is opposite to a magnetic flux direction of the second magnetic driving unit.

(2)

The blade opening and closing device according to (1), wherein the first magnetic driving unit and the second magnetic driving unit are arranged in contact with each other.

(3)

The blade opening and closing device according to (2), wherein a first yoke is provided as a part of the first magnetic driving unit, a second yoke is provided as a part of the second magnetic driving unit, a plate-like first plate yoke part is provided as a part of the first yoke, a plate-like second plate yoke part is provided as a part of the second yoke, and the first plate yoke part and the second plate yoke part are arranged in contact with each other in a thickness direction.

(4)

The blade opening and closing device according to (3), wherein the pair of first plate yoke parts is provided, the pair of second plate yoke parts is provided, the pair of first plate yoke parts and the pair of second plate yoke part are arranged in the same direction, the first magnet and the first coil are arranged between the pair of first plate yoke parts, and the second magnet and the second coil are arranged between the pair of second plate yoke parts.

(5)

The blade opening and closing device according to any one of (1) to (4), wherein a traveling direction of light for passing through the opening is assumed to be an optical axis direction, the first magnetic driving unit and the second magnetic driving unit are aligned in a direction perpendicular to the optical axis direction, the first magnet and the second magnet are bipolar magnetized, and a positional relation of an N-pole and an S-pole of the first magnet is opposite to that of the second magnet.

(6)

The blade opening and closing device according to any one of (1) to (5), wherein the first opening and closing blades and the second opening and closing blades are movable between an opening position where the opening is opened and a closing position where the opening is closed, the first opening and closing blades and the second opening and closing blades are formed of a plurality of sheet-shaped sectors, at least the plurality of sectors is partially positioned to be overlapped in the thickness direction, and as the first opening and closing blades and the second opening and closing blades are moved from the closing position to the opening position, an overlapped area of the sectors is increased.

(7)

The blade opening and closing device according to any one of (1) to (6), wherein a storage case to be attached to the base body is provided, and the first magnetic driving unit and the second magnetic driving unit are stored in the storage case.

(8)

The blade opening and closing device according to any one of (1) to (7), wherein the first magnetic driving unit and the second magnetic driving unit are aligned in a state where an axis direction of the first coil is the same as that of the second coil.

(9)

The blade opening and closing device according to any one of (1) to (7), wherein the first magnetic driving unit and the second magnetic driving unit are aligned in a state where a direction perpendicular to the axis direction of the first coil is the same as that of the second coil.

(10)

The blade opening and closing device according to (9), wherein rotation of the first magnet moves the first opening and closing blades, rotation of the second magnet moves the second opening and closing blades, and the first magnet and the second magnet are aligned in a state where a rotation axis direction of the first magnet is the same as that of the second magnet.

(11)

An image pickup device including:

a blade opening and closing device configured to control light to be taken in via an optical system; and an image pickup element configured to photoelectrically convert the light to be taken via the optical system, wherein the blade opening and closing device includes a base body which includes an opening for transmitting light, a first magnetic driving unit which includes a first magnet and a first coil, a second magnetic driving unit which includes a second magnet and a second coil, first opening and closing blades which are moved by the first magnetic driving unit relative to the base body and open and close the opening, and second opening and closing blades which are moved by the second magnetic driving unit relative to the base body and open and close the opening, and a magnetic flux direction of the first magnetic driving unit is opposite to a magnetic flux direction of the second magnetic driving unit.

REFERENCE SIGNS LIST

1 image pickup device
10 optical system
11 blade opening and closing device
12 image pickup element
13 base body
13a opening
15 storage case
16 first magnetic driving unit
17 second magnetic driving unit
19 first opening and closing blades
20 second opening and closing blades
29 first magnet
30 first coil
31 first yoke
36 first plate yoke part
39 second magnet
40 second coil
41 second yoke
46 second plate yoke part
56 first sector
57 second sector
100 image pickup device
89 image pickup element

The invention claimed is:

1. A blade opening and closing device, comprising:
a base body that comprises an opening to transmit light;
a first magnetic driving unit that comprises:
   a first magnet;
   a first coil; and
   a first yoke comprising a first plate yoke part;
a second magnetic driving unit that comprises:
   a second magnet;
   a second coil; and
   a second yoke comprising a second plate yoke part;
a plurality of first opening and closing blades configured to open and close the opening, wherein the plurality of first opening and closing blades are driven relative to the base body, by the first magnetic driving unit; and a plurality of second opening and closing blades configured to open and close the opening, wherein
the plurality of second opening and closing blades are driven relative to the base body, by the second magnetic driving unit,
a magnetic flux direction of the first magnetic driving unit is opposite to a magnetic flux direction of the second magnetic driving unit,
the first magnetic driving unit and the second magnetic driving unit are aligned in a state in which a direction perpendicular to an axis direction of the first coil is same as a direction perpendicular to an axis direction of the second coil,
the first magnetic driving unit is in contact with the second magnetic driving unit, and
the first plate yoke part and the second plate yoke part are arranged in contact with each other.

2. The blade opening and closing device according to claim 1, wherein
a pair of first plate yoke parts and a pair of second plate yoke parts are arranged in a same direction,
the first magnet and the first coil are arranged between the pair of the first plate yoke parts, and
the second magnet and the second coil are arranged between the pair of the second plate yoke parts.

3. The blade opening and closing device according to claim 1, wherein
a traveling direction of light to pass through the opening is an optical axis direction,
the first magnetic driving unit and the second magnetic driving unit are aligned in a direction perpendicular to the optical axis direction, and
the first magnet and the second magnet are bipolar magnetized, and a positional relation of an N-pole and an S-pole of the first magnet is opposite to that of the second magnet.

4. The blade opening and closing device according to claim 1, wherein
the plurality of first opening and closing blades and the plurality of second opening and closing blades are movable between an opening position where the opening is opened and a closing position where the opening is closed,
the plurality of first opening and closing blades and the plurality of second opening and closing blades comprise a plurality of sheet-shaped sectors,
at least one sheet-shaped sector of the plurality of sheet-shaped sectors is partially positioned to overlap in a thickness direction, and
an increase in an overlapped area of the plurality of sheet-shaped sectors is based on a movement of the plurality of first opening and closing blades and the plurality of second opening and closing blades from the closing position to the opening position.

5. The blade opening and closing device according to claim 1,
further comprising a storage case attached to the base body,
wherein the first magnetic driving unit and the second magnetic driving unit are stored in the storage case.

6. The blade opening and closing device according to claim 1, wherein
rotation of the first magnet moves the plurality of first opening and closing blades, rotation of the second magnet moves the plurality of second opening and closing blades, and
the first magnet and the second magnet are aligned in a state where a rotation axis direction of the first magnet is same as an axis direction of the second magnet.

7. An image pickup device, comprising:
a blade opening and closing device configured to control light taken via an optical system; and
an image pickup element configured to photoelectrically convert the light taken via the optical system,
wherein the blade opening and closing device includes:
a base body that comprises an opening to transmit the light,
a first magnetic driving unit that comprises:
a first magnet,
a first coil, and
a first yoke comprising a first plate yoke part,
a second magnetic driving unit that comprises:
a second magnet,
a second coil, and
a second yoke comprising a second plate yoke part,
a plurality of first opening and closing blades configured to open and close the opening,
wherein the plurality of first opening and closing blades are driven relative to the base body, by the first magnetic driving unit, and
a plurality of second opening and closing blades configured to open and close the opening, wherein
the plurality of second opening and closing blades are driven relative to the base body, by the second magnetic driving unit,
a magnetic flux direction of the first magnetic driving unit is opposite to a magnetic flux direction of the second magnetic driving unit,
the first magnetic driving unit and the second magnetic driving unit are aligned in a state in which a direction perpendicular to an axis direction of the first coil is same as a direction perpendicular to an axis direction of the second coil,
the first magnetic driving unit is in contact with the second magnetic driving unit, and
the first plate yoke part and the second plate yoke part are arranged in contact with each other.

8. A blade opening and closing device, comprising:
a base body that comprises an opening to transmit light;
a first magnetic driving unit that comprises a first magnet and a first coil;
a second magnetic driving unit that comprises a second magnet and a second coil;
a plurality of first opening and closing blades configured to open and close the opening,
wherein the plurality of first opening and closing blades are driven relative to the base body, by the first magnetic driving unit; and
a plurality of second opening and closing blades configured to open and close the opening, wherein
the plurality of second opening and closing blades are driven relative to the base body, by the second magnetic driving unit,
a magnetic flux direction of the first magnetic driving unit is opposite to a magnetic flux direction of the second magnetic driving unit,
the first magnetic driving unit further comprises a first yoke which comprises a first plate yoke part,
the second magnetic driving unit further comprises a second yoke which comprises a second plate yoke part, and the first plate yoke part and the second plate yoke part are arranged in contact with each other.

\* \* \* \* \*